United States Patent [19]

Berg et al.

[11] Patent Number: 5,895,794
[45] Date of Patent: Apr. 20, 1999

[54] SHELF STABLE CROSS-LINKED EMULSIONS WITH OPTIMUM CONSISTENCY AND HANDLING WITHOUT THE USE OF THICKENERS

[75] Inventors: Daniel Trent Berg, Muskego, Wis.; Donald Taylor Liles, Midland, Mich.; Leon Andre Marteaux, Brussels, Belgium; Nick Evan Shephard, Blacksburg, Va.; Andreas Thomas Franz Wolf; Eric Jude Joffre, both of Midland, Mich.

[73] Assignee: Dow Corning Corporation, Midland, Mich.

[21] Appl. No.: 08/430,776

[22] Filed: Apr. 27, 1995

Related U.S. Application Data

[63] Continuation-in-part of application No. 08/113,029, Aug. 30, 1993, Pat. No. 5,438,095.

[51] Int. Cl.$^6$ .................... C08K 9/10; C08J 3/02; C08L 83/04
[52] U.S. Cl. .................... 523/217; 523/200; 524/837; 524/863; 524/862; 524/858; 524/789; 524/788; 524/779; 524/786; 524/785; 524/787; 524/457; 524/448; 524/425; 524/433; 524/445; 524/437; 524/441; 524/432; 524/449; 524/451; 524/435; 524/436

[58] Field of Search .................... 524/837, 863, 524/862, 858, 789, 788, 779, 786, 785, 787, 457, 448, 425, 433, 445, 437, 441, 432, 449, 451, 435, 436; 523/200, 217

[56] References Cited

U.S. PATENT DOCUMENTS 4,417,024 11/1983 Koda et al. .................... 524/837

*Primary Examiner*—Karen A. Dean
*Attorney, Agent, or Firm*—Richard I. Gearhart

[57] ABSTRACT

A crosslinked polysiloxane dispersion comprising a siloxane polymer, polymer mixture, or polymer/solvent mixture, capable of crosslinking via condensation, addition or free radical reactions, and having a viscosity of greater than 5000 mPa.s but less than 500,000 mPa.s, if required, 0.1 to 10 weight parts of a crosslinking agent, and, if required, depending on the nature of the catalyst and silicon cure system, 0.000001 to 10 weight parts of a catalyst, 0.5 to 10 weight parts of a surfactant or surfactant mixture, and 0.5 to 25 weight parts water per 100 weight parts siloxane polymer. Optionally, adhesion promoters, pigments, reinforcing or non-reinforcing fillers, silicone resins, stabilizers, freeze/thaw additives, etc. may also be added to the dispersion.

61 Claims, No Drawings

SHELF STABLE CROSS-LINKED EMULSIONS WITH OPTIMUM CONSISTENCY AND HANDLING WITHOUT THE USE OF THICKENERS

This is a continuation-in-part of application Ser. No. 08/113,029 filed on Aug. 30, 1993, now U.S. Pat. No. 5,438,095.

FIELD OF THE INVENTION

This invention relates to an aqueous dispersion of crosslinked polysiloxane which does not require thickeners or other rheology controlling additives to achieve optimum handling characteristics at solids contents above 75% and which, upon drying, yields an elastomer with improved durometer, tensile and elongation properties.

BACKGROUND OF THE INVENTION

European Patent Publication 0 463 431 A2 discloses a method for producing emulsions from high viscosity polysiloxanes, bi-modal polysiloxane fluids, functional polysiloxanes and mixtures thereof. The method comprises forming a thick phase emulsion by blending a polysiloxane, at least one primary surfactant and water. To the blend, at least one secondary surfactant is added. The mixture is then mixed using shear for a sufficient period of time until an average particle size of less than 350 nanometers is achieved. The thick phase emulsion is then diluted with additional water to the desired silicone content to form the final emulsion.

PCT publication WO 94/09058 discloses a method for preparing oil-in-water emulsions of oils, gums or silicone resins by kneading a mixture of (1) a silicone phase (A) with a viscosity of at least 3 Pas or a consistency of at least 20, and (2) an aqueous phase comprising water, at least one surfactant (B) and optionally at least one water-soluble thickening polymer (C), wherein the relative amounts of water, (B) and optionally (C) are such that the aqueous phase preferably has at least as much viscosity or consistency as the silicone phase (A), said kneading being performed for a sufficient time and with sufficient shear to give an oil-in-water emulsion having a particle size of 0.1–5 micrometer; and optionally by diluting the medium with water.

PCT application WO 94/09059 discloses aqueous dispersions containing: a silicone oil (A) which is cross-linkable by condensation, optionally in the presence of a cross-linking agent (B), into an elastomer; optionally a cross-linking agent (B), a silane (C) and a mineral filler (D); and a catalytic amount of a hardening compound (E). Said dispersions are characterized in that they are produced by kneading a mixture of 1) a silicone phase (F) with a viscosity of at least 3 Pas, containing the oil (A) and optionally one or more of components (B), (C), (D) or (E), and 2) an aqueous phase comprising water and at least one surfactant (G), wherein the weight ratio water/water+surfactant(s) is such that the viscosity of the aqueous phase is preferably at least as high as that of the silicone phase (F); for a sufficient time and with sufficient shear to give an oil-in-water emulsion having a particle size of 0.1–5 micrometers; and optionally by diluting with water until a 25–97% dry extract is obtained; followed by adding the components) not present in the silicone phase (F).

U.S. Pat. No. 3,355,406 to Cekada teaches silicone rubber latices reinforced by adding a silsesquioxane having the unit formula R"SiO$_{3/2}$, wherein the R" is a member selected from the group consisting of the methyl, ethyl, vinyl, phenyl and 3,3,3-trifluoropropyl radicals, said silsesquioxane having a particle size in the range of 10 to 1000 A. More specifically the invention relates to a silicone latex comprising (1) a curable essentially linear siloxane polymer having a D.P. of at least 10 and (2) a silsesquioxane having the unit formula R"Si$_{3/2}$, wherein R" is a member selected from the group consisting of the methyl, ethyl, vinyl, phenyl and 3,3,3-trifluoropropyl radicals, said silsesquioxane having a particle size in the range of 10 to 1000 A. The silicone latex above can also contain a catalyst and/or a cross-linking agent.

U.S. Pat. No. 4,788,001 to Narula teaches oil-in-water emulsions made by a process involving the mixing of the oil and water in the presence of three nonionic surfactants having certain HLB values. The process is particularly useful for emulsifying an oil having a viscosity exceeding 50,000 centipoise (50 pascal-seconds). Any oil can be emulsified by this process, including hydrocarbon oils like mineral oil and petrolatum, and silicones, including fluids, gums and resins. A particularly useful emulsion prepared by this process is an emulsion of a bi-modal silicone which contains substantial amounts of a volatile silicone and a silicone gum.

U.S. Pat. No. 5,034,455 to Stein et al. teaches curable silicone caulk compositions using a non-ionically stabilized silanol-terminated polydiorganosiloxane, water, a silane cross-linker, a tin condensation catalyst, and calcium carbonate.

U.S. Pat. No. 51037,878 to, Cerles et al. teaches aqueous dispersions of a silicone, crosslinkable into elastomeric state upon removal of water therefrom under ambient conditions, well adapted for formulation into paints and for the production of silicone elastomer seals. The composition includes (A) 100 parts by weight of an oil-in-water emulsion containing a stabilizing amount of at least one anionic and/or nonionic surfactant and at least one alkoxylated diorganopolysiloxane, (B) an effective amount of an inorganic siliceous or non-siliceous filler material, and (C) a catalytically effective amount of a metal curing catalyst.

U.S. Pat. No. 5,045,231 to Braun et al. teaches aqueous dispersions of organopolysiloxanes containing the following components. (A) organopolysiloxane having groups which can undergo condensation, (B) condensation catalyst; (C) organopolysiloxane resin; and (D) diorganosilanolate and/or condensation products thereof formed by splitting off water.

U.S. Pat. No. 5,145,907 to Kalinowski et al. teaches a shelf stable aqueous silicone emulsion which yields an elastomer upon removal of the water, produced by combining a reactive polydiorganosiloxane present as a cationic or nonionic emulsion of dispersed particles in water, a cross-linker, and a tin catalyst. The tin catalyst is in the form of a divalent tin atom combined with organic radicals. The emulsion can be reinforced with colloidal silica without effecting the shelf life of the reinforced emulsion.

SUMMARY OF THE INVENTION

The present invention relates to a silicone latex and a method of producing same. The silicone latex is free of rheology modifiers, having a plurality of crosslinked polysiloxane particles, wherein said silicone latex has at least 75% silicone content by weight, said silicone latex comprising (a) a crosslinked product of (i) 100 weight parts of a siloxane polymer or polymer mixture having a viscosity of greater than 5000 mpa.s but less than 500,000 mpa.s at 25° C., and (ii) up to 20 weight parts crosslinker, the siloxane polymer or polymer mixture having at least one polymer species of the following Formula (I):

where n is 0, 1, 2 or 3 and z is an integer from 500 to 5000,

X is hydrogen, a vinyl group, a hydroxyl group, any condensable or hydrolyzable group, Y is a Si atom or a Si—$(CH_2)_m$—$SiR^1_2$ group, where m is 1 to 8, R is individually selected from the group consisting of aliphatic alkyl, aminoalkyl, polyaminoalkyl, epoxyalkyl, alkenyl, or aromatic groups, and $R^1$ is individually selected from the group consisting of X, aliphatic alkyl, alkenyl, and aromatic groups, (b) 0.5 to 10 weight parts surfactant, (c) 0.5 to 25 weight parts water, and (d) up to 5 weight parts catalyst.

The crosslinked polysiloxane dispersion comprises a siloxane polymer, polymer mixture, or polymer/solvent mixture, capable of crosslinking via condensation, addition or free radical reactions, and having a viscosity of greater than 5000 mPa.s but less than 500,000 mPa.s, if required, 0.1 to 10 weight parts of a crosslinking agent, and, if required, depending on the nature of the catalyst and silicon cure system, 0.000001 to 10 weight parts of a catalyst, 0.5 to 10 weight parts of a surfactant or surfactant mixture, and 0.5 to 25 weight parts water per 100 weight parts siloxane polymer. Optionally, adhesion promoters, pigments, reinforcing or non-reinforcing fillers, silicone resins, stabilizers, freeze/thaw additives, etc. may also be added to the dispersion. The dispersion is produced by mixing at least the silicone polymer, surfactant and 1–10 parts by weight, preferably 2–6 parts by weight of water under sufficient shear and for a sufficient period of time to obtain a high solids "oil-in-water" emulsion forming a characteristic clear gel phase having at least 90% polymer solids content and having particle sizes between 0.1 and 5 micrometers, preferably between 0.2 and 2 micrometers. Cross-linker, if required, and catalyst, if required, and optional further ingredients may be added directly to the high solids clear gel phase or after dilution of the clear gel with water to the desired solids content. Alternatively, either cross-linker or catalyst, or both, as well as one or all of the further optional ingredients may be added to the mixture prior to the emulsification in to the gel phase. In any case, it is important for the practice of the instant invention that a high solids gel is formed first after the emulsification step, prior to dilution of the emulsion with further water. The clear gel high solids emulsion containing silicone polymer, water and surfactant and optionally crosslinker and catalyst is shelf-stable and may be stored as an intermediate for up to 24 months. In order to practice the instant invention it is not required to match the viscosities of the silicone phase and the surfactant/water phase. Viscosities of the silicone and surfactant/water phases may differ by more than a factor of 2, and excellent results have been obtained, when the viscosities of the two phases differed as much as a factor of 1000. The crosslinked polysiloxane dispersion can be transformed into an elastomer by the removal of water.

The present invention represents several significant advances in the art. First, the process of making the dispersion is improved since the high solids gel phase provides for a higher shear and lower particle size distribution. Second, the process of making the dispersion is further improved in as far as it does not require close matching of the viscosities of the silicone polymer phase and the water/surfactant phase. Both processes are not known in the art. Finally, the present invention teaches that the addition of certain types of fillers, in particular, ammonium treated colloidal silica, can alter the physical characteristics of the resulting elastomer and also achieve excellent heat stability. A further advantage of the present invention is that due to the high polymer solids content of the diluted gel (above 75%), the composition does not require thickeners or other rheology modifiers to achieve excellent handling characteristics, such as desired extrusion rate and "body" of the dispersion (resistance of the wet material felt during tooling of the dispersion) Further, the absence of thickener(s) makes possible the manufacture of a "clear" sealant, since the thickener is opaque and clouds the dispersion. A further advantage of the present invention is the versatility of the process, allowing mixing of silicone polymer, water, surfactant, and optionally cross-linker and catalyst in the manufacture of a high solids oil-in-water emulsion as a gel phase intermediate. The gel phase intermediate can be used immediately after preparation, or stored for up to 24 months. The high solids gel is then diluted with water to form a dispersion having greater than 75% silicone solids content. The gel can be further processed by adding additional ingredients and diluting the dispersion to the desired solids content. Finally, the present invention can be practiced with a wide variety of silicon cure chemistries which allows for manufacture of products with improved shelf-life, compatibility, and low toxicity.

DETAILED DESCRIPTION OF THE INVENTION

The invention comprises a) a crosslinked polysiloxane dispersion formed from a siloxane polymer or polymer mixture, capable of crosslinking via condensation, addition or free radical reactions, and having a viscosity of greater than 5000 mPa.s but less than 500,000 mPa.s; b) if required, 0.1 to 10 weight parts of a crosslinking agent; c) if required, depending on the nature of the catalyst and silicon cure system, 0.000001 to 10 weight parts of a catalyst; d) 0.5 to 10 weight parts of a surfactant or surfactant mixture; and e) 0.5 to 25 weight parts water per 100 weight parts siloxane polymer. Optionally, adhesion promoters, pigments, reinforcing or non-reinforcing fillers, silicone resins, stabilizers, freeze/thaw additives, etc. may also be added to the dispersion. The dispersion is produced by mixing at least the silicone polymer, surfactant and 1–10 parts by weight, preferably 2–6 parts by weight of water under sufficient shear and for a sufficient period of time to obtain a high solids "oil-in-water" emulsion forming a characteristic clear gel phase having at least 90% polymer solids content and having particle sizes between 0.1 and 5 micrometers, preferably between 0.2 and 2 micrometers. Cross-linker, if required, and catalyst, if required, and optional further ingredients may be added directly to the high solids clear gel phase to crosslink the silicone polymer within the emulsion particles forming the crosslinked polysiloxane dispersion. The crosslinker and catalyst may be added directly to the high solids clear gel phase or after dilution of the clear gel with water to the desired silicone content of at least 75% by weight. Alternatively, either cross-linker or catalyst, or both, as well as one or all of the further optional ingredients may be added to the mixture prior to the emulsification step. In any case, it is important for the practice of the instant invention that a high solids gel is formed first after the emulsification step, prior to dilution of the emulsion with further water to achieve the silicone content of at least 75% by weight. The crosslinked polysiloxane dispersion can be transformed into an elastomer upon the removal of water.

As used herein, the term "silicone content" means the total amount by weight of silicone polymer, polymer mixture and crosslinker. The term "rheology modifier" as used herein means a composition, such as a thickener, added primarily for the purpose of altering the rheological properties of the latex dispersion. Typical rheological modifiers include, but are not limited to, polyvinyl alcohols, polyethylene glycols, polyvinyl pyrrolidones, polyacrylates of alkaline metals, carrageenans, alginates, carboxymethylcelluloses, methylcelluloses, hydroxypropylcelluleoses, hydroxyethylcelluloses, and xanthin gum.

Polymers, Polymer Mixtures, Polymer/Solvent Mixtures

The siloxane polymers or polymer mixtures used as starting materials for the present invention are well known to those skilled in the art. These polymers are characterized as having a viscosity of greater than 5000 mPa.s but less than 500.000 mPa.s measured at 25° C. The siloxanes include, for example, polymers described by the following Formula (I):

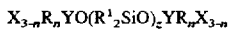

where n is 0, 1, 2 or 3 and z is an integer from 500 to 5000, X is hydrogen, a vinyl group, a hydroxyl group, any condensable or hydrolyzable group, Y is a Si atom or a Si—(CH2)$_m$—SiR$^1$$_2$ group, with m being a positive integer, R is individually selected from the group consisting of aliphatic aminoalkyl, polyaminoalkyl, epoxyalkyl, alkenyl organic, or aromatic groups, and R$^1$ is individually selected from the group consisting of X, aliphatic and aromatic groups.

X can be hydrogen, a vinyl group, a hydroxyl group, or any condensable or hydrolyzable group. The term "hydrolyzable group" means any group attached to the silicon which is hydrolyzed by water at room temperature. The hydrolyzable group X includes hydrogen, halogen atoms such as F, Cl, Br or I; groups of the formula —OY when Y is any hydrocarbon or halogenated hydrocarbon group such as methyl, ethyl, isopropyl, octadecyl, allyl, hexenyl, cyclohexyl, phenyl, benzyl, beta-phenylethyl, any hydrocarbon ether radical such as 2-methoxyethyl, 2-ethoxyisopropyl, 2-butoxyisobutyl, p-methoxyphenyl or —(CH$_2$CH$_2$O)$_2$CH$_3$; or any N,N-amino radical such as dimethylamino, diethylamino, ethylmethylamino, diphenylamino, or dicyclohexylamino. X can also be any amino radical such as NH$_2$, dimethylamino, diethylamino, methylphenylamino or dicyclohexylamino; any ketoxime radical of the formula —ON═CM$_2$ or —ON═CM' in which M is any monovalent hydrocarbon or halogenated hydrocarbon radical such as those shown for Y above and M' is any divalent hydrocarbon radical both valences of which are attached to the carbon, such as hexylene, pentylene or octylene; ureido groups of the formula —N(M)CONM"$_2$ in which M is defined above hydrocarbon radical such as those shown for Y above and M" is H or any of the M radicals; carboxyl groups of the formula —OOCMM" in which M and M" are defined above or halogenated hydrocarbon radical as illustrated for Y above, or carboxylic amide radicals of the formula —NMC═O(M") in which M and M" are defined above. X can also be the sulfate group or sulfate ester groups of the formula—OSO$_2$(OM) where M is defined above hydrocarbon or halogenated hydrocarbon radical illustrated for Y; the cyano group; the isocyanate group; and the phosphate group or phosphate ester groups of the formula —OPO(OM)$_2$ in which M is defined above.

The most preferred groups of the invention are hydroxyl groups or alkoxy groups. Illustrative examples of the alkoxy groups are methoxy, ethoxy, propoxy, butoxy, isobutoxy, pentoxy, hexoxy, 2-ethylhexoxy, and the like; alkoxy radicals such as methoxymethoxy, ethoxymethoxy, and the like; and alkoxyaryloxy such as ethoxyphenoxy and the like. The most preferred alkoxy groups are methoxy or ethoxy.

R is individually selected from the group consisting of aliphatic, alkyl, aminoalkyl, polyaminoalkyl, epoxyalkyl, alkenyl organic, and aromatic aryl groups. Most preferred are the methyl, ethyl, octyl, vinyl, allyl, and phenyl groups.

R$^1$ is individually selected from the group consisting of X, hydrogen, vinyl, aliphatic, alkyl, alkenyl, and aromatic groups. Most preferred are methyl, ethyl, octyl, trifluoropropyl, vinyl, and phenyl groups.

When the siloxane polymer of formula (I) has an average of more than two condensable or hydrolyzable groups per molecule, it is not necessary to have a cross-linker present in order to form a crosslinked polymer. The condensable or hydrolyzable groups on different siloxane molecules can react with each other to form the required crosslinks.

The siloxane polymer of the present invention can be a single siloxane represented by the aforesaid formula, or mixtures of siloxanes represented by the aforesaid formula, or solvent/polymer mixtures, and the term "polymer mixture" is meant to include any of these types of polymers or mixtures of polymers.

The siloxane polymer of the present invention can be a mixture of different kinds of molecules, for example long chain linear molecules and short chain linear or branched molecules. These molecules may react with each other to form a crosslinked network such siloxanes which can take the place of more conventional cross-linkers are illustrated by low molecular weight organosilicon hydrides, such as polymethylhydrogen-siloxane, low molecular weight copolymers containing methylhydrogensiloxy and dimethylsiloxy groups, —(OSi(OEt)$_2$—, (ethylpolysilicate), (OSiMeC$_2$H$_4$Si(OMe)$_3$)$_4$, and (OSi(Me)ON═CR'$_2$)$_4$, where Me is methyl and Et is ethyl.

The siloxane polymer of the present invention, thus, more advantageously also comprises mixtures of siloxane polymers of formula (I), exemplified by, but not limited to, mixtures of a,w-hydroxysiloxy terminated siloxanes and of a,w-bis(triorganosiloxy) terminated siloxanes, mixtures of a,w-hydroxylsiloxy terminated siloxanes and of a-hydroxy, w-triorgano-siloxy terminated siloxanes, mixtures of a,w-dialkoxysiloxy terminated siloxanes and of a,w-triorganosiloxy terminated siloxanes, mixtures of a,w-dialkoxysiloxy terminated siloxanes and of a,w-hydroxysiloxy terminated siloxanes, mixtures of a,w-hydroxysiloxy terminated siloxanes and of a,w-triorganosiloxy terminated poly(diorgano)(hydrogenorgano) siloxane co-polymers, etc. The siloxane polymer of the invention can also comprise mixtures of siloxane polymers of formula (I) as described above with liquid, branched methylpolysiloxane polymers ("MDT fluids") comprising a combination of recurring units of the formulae:

| | |
|---|---|
| (CH$_3$)$_3$Si$_{0.5}$ | ("M") |
| (CH$_3$)$_2$SiO | ("D") |
| CH$_3$SiO$_{1.5}$ | ("T") | and containing from 0.1 to 8% hydroxyl groups. The fluids may be prepared by co-hydrolysis of the corresponding chloro- or alkoxysilanes, as described in U.S. Pat. Nos. 3,382,205; 3,661,817; 3,714,089; 4,356,116; 4,468,760; 5,175,057 and Belgian Patent No. 0,877,267. The proportion of MDT fluids added should not exceed 50 parts, preferably of 1 to 20 parts by weight, per 100 parts by weight of the polymer of formula (I), in order to achieve improved physical properties and adhesion of the resultant polymers. The siloxane polymer of the present invention can also comprise mixtures of siloxane polymers of formula (I) with liquid or solid, branched methylsiloxane polymeric resins comprising a combination of recurring units of the formulae:

| | |
|---|---|
| $(CH_3)_3SiO_{0.5}$ | ("M") |
| $(CH_3)_2SiO$ | ("D") |
| $CH_3SiO_{1.5}$ | ("T") |
| $SiO_2$ | ("Q") | and containing from 0.1 to 8% hydroxyl groups, the fluids may be prepared by co-hydrolysis of the corresponding chloro- or alkoxysilanes, as described in U.S. Pat. Nos. 2,676,182; 2,441,320; 4,707,531; 5,070,175; EP 0,529,547; 0,535,687; DE 4,124,588; JP 05,098,012; WO 93/23455. The MDTQ fluid/resin may be added in a proportion not exceeding 50 parts, preferably of 1 to 10 parts by weight, per 100 parts by weight of the polymer of formula (I) to improve physical properties and adhesion of the resultant polymers. MDTQ fluids/resins can also be mixed with MDT fluids and the polymers of Formula (I). Finally the siloxane polymer can comprise mixtures of siloxane polymers of Formula (I) with compatible organic solvents, to form organic polymer/solvent mixtures. These organic solvents are exemplified by, but not limited to, organophosphate esters, such as trioleylphosphate, trioctylphosphate, or tetraethyleneglycolmonolaurylether-phosphate, as disclosed in U.S. Pat. No. 4,147,855 and German Patent No. 2,802,170 (incorporated by reference); alkanes, such as hexane, heptanes; and higher paraffins, aromatic solvents, such as toluene, benzene; etc. The polymer solvent mixtures can also be added with MDT fluids and/or MDTQ fluids to the polymer of Formula I. Any of the above mixtures of polymers or polymer/solvents can be prepared by mixing the ingredients prior to emulsification or by emulsifying them individually and then mixing the emulsions.

Surfactants

The surfactant of the present invention is selected from nonionic surfactants, cationic surfactants, anionic surfactants, amphoteric surfactants and mixtures thereof. The term "surfactant" is meant to describe a surfactant selected from these categories or a mixture of surfactants from the above referenced categories. The surfactant is present in the composition in an amount of 0.5 to 10 parts by weight, preferably 2 to 10 parts by weight, based on 100 parts by weight of siloxane polymer. Surfactant in an amount from 0.5 to 3 parts by weight based on 100 parts by weight of siloxane polymer may also be used to achieve desirable results.

Most preferred are nonionic surfactants known in the art as being useful in emulsification of polysiloxanes. Useful nonionic surfactants may be exemplified, but not limited to, polyoxyalkylene alkyl ethers, polyoxyalkylene sorbitan esters, polyoxyalkylene esters, polyoxyalkylene alkylphenyl ethers, ethoxylated amides, ethoxylated siloxanes, block copolymers of propylene oxide and ethylene oxide and others. Non-ionic surfactants commercially available and useful in the instant invention may be further exemplified by, but not limited to, TERGITOL TMN-6, TERGITOL 15S40, TERGITOL 15S3, TERGITOL 15S5, and TERGITOL 15S7 produced by Union Carbide Corporation (Danbury, Conn.), BRIJ 30 and BRIJ 35 produced by ICI CHEMICALS (Wilmington, Del.) and TRITON X405 produced by ROHM AND HAAS (Philadelphia, Pa.) MAKON 10 produced by STEPAN Company (Northfield, Ill.), and ETHOMID O/17 produced by AKZO Inc. (Chicago, Ill.) and PLURONIC F38 produced by BASF Corp (Parsippany, N.J.) and Dow Corning 5211 and 5212 (Dow Corning Corp, Midland, Mich.).

Cationic and anionic surfactants known in the art as being useful in emulsification of polysiloxanes are also useful as the surfactant in the instant invention. Suitable cationic surfactants include, but are not limited to, aliphatic fatty amines and their derivatives such as dodecylamine acetate, octadecylamine acetate and acetates of the amines of tallow fatty acids; homologues of aromatic amines having fatty chains such as dodecylanalin; fatty amides derived from aliphatic diamines such as undecylimidazoline; fatty amides derived from disubstituted amines such as oleylaminodiethylamine; derivatives of ethylene diamine; quaternary ammonium compounds such as tallow trimethyl ammonium chloride, dioctadecyldimethyl ammonium chloride, didodecyldimethyl ammonium chloride and dihexadecyldimethyl ammonium chloride; amide derivatives of amino alcohols such as beta-hydroxyethylsteraryl amide; amine salts of long chain fatty acids; quaternary ammonium bases derived from fatty amides of di-substituted diamines such as oleylbenzylamino-ethylene diethylamine hydrochloride; quaternary ammonium bases of the benzimidazolines such as methylheptadecyl benzimidazole hydrobromide; basic compounds of pyridinium and its derivatives such as cetylpyridinium chloride; sulfonium compounds such as octadecylsulfonium methyl sulfate; quaternary ammonium compounds of betaine such as betaine compounds of diethylamino acetic acid and octadecylchloro-methyl ether; urethanes of ethylene diamine such as the condensation products of stearic acid and diethylene triamine; polyethylene diamines; and polypropanolpolyethanol amines.

Cationic surf actants commercially available and useful in the instant invention include, but are not limited to ARQUAD T27W, ARQUAD 16-29, ARQUAD C-33, ARQUAD T50, ETHOQUAD T/13 ACETATE, all manufactured by AKZO CHEMIE (Chicago, Ill.).

Suitable anionic surfactants include, but are not limited to, sulfonic acids and their salt derivatives. The anionic surfactants useful in the instant invention can be exemplified by, but are not limited to, alkali metal sulforicinates; sulfonated glycerol esters of fatty acids such as sulfonated monoglycerides of coconut oil acids; salts of sulfonated monovalent alcohol esters such as sodium oleylisethionate; amides of amino sulfonic acids such as the sodium salt of oleyl methyl tauride; sulfonated products of fatty acids nitrites such as palmitonitrile sulfonate; sulfonated aromatic hydrocarbons such as sodium alpha-naphthalene monosulfonate; condensation products of naphthalene sulfonic acids with formaldehyde; sodium octahydroanthracene sulfonate; alkali metal alkyl sulfates, ether sulfates having alkyl groups of 8 or more carbon atoms, and alkylarylsulfonates having 1 or more alkyl groups of 8 or more carbon atoms.

Anionic surfactants commercially available and useful in the instant invention include, but are not limited to, POLYSTEP A4, A7,A11, A15, A15–30K, A16, A16–22, A18, A13, A17, B1, B3, B5, B11, B12, B19, B20, B22, B23, B24, B-25, B27, B29, C-OP3S; ALPHA-STEP ML40, MC48; STEPANOL MG; all produced by STEPAN Company (Northfield, Ill.), HOSTAPUR SAS produced by HOECHST CELANESE (Chatham, N.J.), HAMPOSYL C30 and L30 produced by W.R.GRACE & CO. (Lexington, Mass.).

Suitable amphoteric surfactants include, but are not limited to, glycinates, betaines, sultaines and alkyl aminopropionates. These can be exemplified by cocoamphglycinate, coco- amphocarboxy-glycinates, cocoamidopropylbetaine, lauryl betaine, cocoamido-propylhydroxy- sultaine, laurylsulataine, and cocoamphodipropionate.

Amphoteric surfactants commercially available and useful in the instant invention include, but are not limited to, REWOTERIC AM TEG, REWOTERIC AM DLM-35, REWOTERIC AM B14 LS, REWOTERIC AM CAS, REWOTERIC AM LP produced by SHEREX CHEMICAL CO. (Dublin, OH).

Water

In addition to adding the surfactant to the polysiloxane, polysiloxane polymer mixture, polysiloxane/solvent mixture, or polysiloxane/organic polymer mixture, the dispersion also includes a predetermined amount of water. The water is present in the composition in an amount of 0.5 to 25 parts by weight of siloxane polymer, and is preferably present in the amount of 6 to 15 parts by weight of siloxane polymer. Water in an amount less from 0.5 to 2 parts by weight of siloxane polymer may also be used to achieve desirable results.

Emulsification Process

After the mixture of siloxane polymer, surfactant and water is formed, the mixture is emulsified by mixing with sufficient shear and for a sufficient period of time to form a high solids gel phase. Either cross-linker or catalyst, or both, may be added to the mixture prior to or after emulsification. The mixing will preferably take place at a temperature on the order of 10° C. to 70° C. Further formulation optional ingredients, such as adhesion promoters, pigments, fillers, etc. may be added either prior or after emulsification. If cross-linker, catalyst, and/or optional ingredients are added after the emulsification step, they may be added either prior or after diluting the gel phase with water to the desired solids content. The gel phase will have a polymer solids content of at least 90%, preferably in the range of 90% to 96%. The gel content may be as high 96–98% polymer.

It is anticipated that in industrial production, any type of mixing equipment may be used to perform the emulsification step, such as batch mixers, planetary mixers, continuous compounders such as single or multiple screw extruders, dynamic or static mixers, colloid mills, homogenizers, and sonolators or combinations of these equipments, such as sonolators and static mixers, batch mixers and dynamic mixers, or dynamic and static mixers.

High Solids Gel Intermediate

The high solids gel phase formed by emulsifying siloxane polymer, surfactant, and water and having a polymer solids content of greater than 90% is shelf-stable and can be stored for up to 24 months prior to further processing.

Dilution Step

After emulsification, the gel phase is diluted with water to achieve a silicone solids content of greater than 75%. Generally, amounts in the range of 5 to 30 parts by weight is added to achieve a solids content in the range of 75% to 98%. A more preferred solids range is 80–92% and the most preferred range is 84–90%. The high silicone solids content of the final dispersion is critical and distinguishes the present invention over the prior art. A silicone latex having a silicone solids content of greater than 75% allows the silicone latex to be used as a sealant without the need for thickeners or fillers. This is in contrast to the prior art, for example European Patent Publication 0 463 431 A2, PCT publication WO 94/09058, and PCT application WO 94/09059, which do not teach a method of producing a dispersion of crosslinked silicone latex having a silicone solids content of greater than 75%, and teaches the use of a thickener. The water is added to achieve the desired product consistency or to facilitate the addition of other components of the composition, such as fillers, pigments, etc.

Adhesion Promoters

Adhesion promoters may be added as optional ingredient to the compositions taught by the present invention. They may be added either before or after the emulsification step. If added after the emulsification step, they may be added either before or after diluting the high solids gel phase with water to the desired solids content. Suitable adhesion promoters are exemplified by, but not limited to, silanes of the formula $$R_nSiX_{4-n}$$

where n is 0, 1 or 2, and X is hydrogen, a vinyl group, a hydroxyl group or condensable or hydrolyzable group of the same definition as used above, and R is individually selected from the group consisting of aliphatic alkyl, aminoalkyl, polyaminoalkyl, epoxyalkyl, alkenyl organic, or aromatic aryl groups as defined above.

Silanes or siloxanes particularly useful in the practice of the present invention with addition cure systems are those that have both SiH and SiX functionalities on the same molecule. An example of such a silane is:

$$HSiR_2-(SiR^1{}_2O)_u-SiR(OCH_3)_3$$

where u is a positive integer less than 5000.

Cross-linkers, Catalysts, Cure Chemistries

The cross-linkers and catalysts of the present invention depend on the type of silicon cure system employed to cure the composition. These curing mechanisms are well known to those skilled in the art, and are discussed below generally. It is of course contemplated that in accordance with the method of the present invention, the cross-linkers or catalysts may be added either individually before or after emulsification, or both added before or after emulsification.

Cure Systems

One class of silicon cure systems involves condensation reactions, for instance between silanol (Si—OH) and siliconhydride (Si—H) groups; between silanol (Si—OH) and hydrolyzable or condensable silyl groups, such as Si—OC(O)CH$_3$, Si—NR$_2$, Si—ON=CR$_2$, etc; between siliconhydride and hydrolyzable or condensable groups; between two hydrolyzable or condensable groups of the same or different species; and the like. One example of this cure system is the reaction between a siloxane polymer bearing silanol groups and a cross-linking compound bearing hydrolyzable groups directly attached to silicon atom(s) Another example of this cure system is the reaction between a siloxane polymer bearing hydrolyzable or condensable groups directly attached to silicon atom(s) and a cross-linking compound bearing silanol groups. Another example of this cure system is the reaction between two siloxane polymers bearing hydrolyzable or condensable groups attached directly to silicon atom(s) A further example of this cure system is the reaction between a siloxane polymer bearing hydrolyzable or condensable groups directly attached to silicon atom(s) and a siloxane polymer bearing active hydrogen atoms, such as in hydroxyl, ureido, mercapto, or amino groups. The following condensation cure chemistries are considered useful for the practice of this invention:

(a) the polymer bears hydroxyl groups attached directly to silicon atom(s); and the cross-linking compound is a silane, a siloxane oligomer or polymer, a siloxane resin, or a silicon modified organic oligomer, polymer, or resin bearing hydrolyzable or condensable groups attached directly to silicon atom(s);

(b) the polymer bears hydrolyzable or condensable groups directly attached to silicon atom(s); and the cross-linking compound is a siloxane oligomer or polymer, a siloxane resin, a silica, a silicate, a siliconate, or a silicon modified organic oligomer, polymer or resin bearing silanol groups;

(c) the polymer bears hydrolyzable or condensable groups directly attached to silicon atom(s); and the crosslinking compound is a silane, a siloxane oligomer or polymer, a siloxane resin, or a silicon modified organic oligomer, polymer, or resin bearing hydrolyzable or condensable groups attached directly to silicon atom (s); the hydrolyzable groups on the siloxane polymer and the cross-linking compound being the same or different; and, if the cross-linking compound is a polymer, the first polymer and the cross-linking compound (second polymer) being the same or different polymers;

(d) the polymer bears hydroxyl groups attached directly to silicon atom(s); and the cross-linking compound is a silane, a siloxane oligomer or polymer, a siloxane resin, or a silicon modified organic oligomer, polymer or resin bearing silicon hydride groups and, optionally, other hydrolyzable or condensable groups attached directly to silicon atom(s);

(e) the polymer bears hydrolyzable or condensable groups attached directly to silicon atom(s); and the cross-linking compound is a silane, a siloxane oligomer or polymer, a siloxane resin, or a silicon modified organic oligomer, polymer or resin bearing silicon hydride groups and, optionally, other hydrolyzable or condensable groups attached directly to silicon atom(s);

(f) the polymer bears silicon hydride groups and, optionally, other hydrolyzable or condensable groups attached directly to silicon atom(s) and the crosslinking compound is a silane, a siloxane oligomer or polymer, a siloxane resin, or a silicon modified organic oligomer, polymer, or resin bearing hydrolyzable or condensable groups;

(g) the polymer bears silicon hydride groups and, optionally, other hydrolyzable or condensable groups attached directly to silicon atom(s); and the crosslinking compound is a siloxane oligomer or polymer, a siloxane resin, a silica, a silicate, a siliconate, or a silicon modified organic oligomer, polymer, or resin bearing silanol groups;

The number of reactive radicals on the siloxane polymer and the cross-linker determine, whether a cured elastomer is obtained. An elastomeric network is being formed by the condensation cure, if the sum of the reactive radicals on the polymer and the reactive radicals on the cross-linker is at least 5. For example, if the polymer has two hydroxysiloxy groups and the cross-linker has three condensable groups directly attached to silicon atom(s), an elastomer is obtained. An elastomer is also obtained by reacting a siloxane polymer bearing a total of four hydrolyzable groups attached to two silicon atoms with another siloxane polymer bearing two silanol groups. However, no elastomer is obtained by reacting a siloxane polymer bearing two silanol groups with a cross-linker bearing two hydrolyzable groups directly attached to silicon atom(s).

Some condensation cure chemistries require a catalyst to effect the reaction between polymer and crosslinking compound. Suitable silanol condensation catalysts are well know in the art. Examples of suitable condensation catalysts preferably employed in the condensation reactions (a) to (g) are: (organo)metallic compounds, amino compounds, carboxylic acids, salts of amino compounds with carboxylic acids or other acids, low molecular weight polyamide resins obtained by the reaction of excess polyamines with polybasic acids, the reaction products between epoxy compounds and an excess of polyamines, or mixtures of above condensation catalysts. Specific examples of (organo)metallic compounds are the salts of a carboxylic acids, alcoholates and halides of the metals lead, zinc, zirconium, titanium, antimony, iron, cadmium, tin, barium, calcium or manganese as taught in U.S. Pat. Nos. 3,355,406, 3,706,695, 4,100,124, 4,288,356, 4,587,288, and 4,608,412, which are incorporated herein by reference. Further specific examples of (organo)metallic compounds are titanic acid esters and chelates, such as tetrabutyl titanate, tetrapropyl titanate, titanium tetraacetyl acetonate, or dibutoxytitanium bis(ethyl acetoacetate); zirconium chelates, such as zirconium tetraacetyl acetonate; organo aluminum compounds, such as aluminum trisacetyl acetonate, aluminum trisethyl acetoacetonate, or diisopropoxy aluminum ethyl acetoacetonate, etc. Specific examples of amino compounds are butyl amine, octyl amine, dibutyl amine, monoethanol amine, diethanol amine, triethanol amine, diethylene triamine, triethylene tetramine, triethylene diamine, oleyl amine, cyclohexyl amine, benzyl amine, diethylaminopropyl amine, xylylene diamine, guanidine, diphenyl guanidine, 2,4,6-tris (dimethyl aminomethyl) phenol, morpholine, N-methyl morpholine, 2-ethyl-4-methylimidazole, 1,8-diazabicyclo (5,4,0) undecene-7, aminosilanes, such as g-amino propyltrimethoxysilane or N-(b-aminoethyl)-g-aminopropylmethyldimethoxysilane. Specific examples of carboxylic acids are formic acid, acetic acid, etc.

Particularly preferred (organo)metallic catalysts which act as condensation catalysts are (organo)tin compounds of carboxylic acids having from 1 to 18 carbon atom(s) and (organo)tin halides, in particular organotin octoates, naphthenates, hexoates, laurates, acetates, bromides and chlorides. Specific examples of such (organo)tin compounds are tin(II)octoate, dibutyltin dilaurate, octyltin triacetate, dioctyltin dioctoate, dioctyltin diacetate, didecyltin diacetate, dibutyltin diacetate, dibutyltin dibromide, dioctyltin dilaurate, and trioctyltin acetate. Preferred compounds are tin(II)octoate and diorganotin dicarboxylates, in particular dibutyltin dilaurate, dioctyltin dilaurate, dibutyltin diacetate and dioctyltin diacetate. The catalyst may also be the product of a reaction of a tin salt, in particular of a tin dicarboxylate, with an alkoxysilane or ethyl polysilicate, as described in U.S. Pat. Nos. 3,862,919, 4,102,860, 4,137,249, 4,152,343. However, other tin catalysts can also be utilized, such as a member selected from the class consisting of stannoxanes, hydroxystannoxanes, and monoalkoxyacylstannanes. More particularly, diacylstannoxane, acylhydroxystannoxane, monomethoxyacylstannanes, dihalostannoxane or halohydroxystannoxane have been found effective. If silica is used as a reinforcing filler in the composition, divalent tin compounds are the most preferred condensation catalysts as described in U.S. Pat. No. 4,954, 565. The divalent, stannous form of (organo)tin compounds do not cause a reaction between the silanol functional polymer and silica as is caused when the tetravalent, stannic form of (organo)tin compounds are used as catalysts. The preferred stannous catalyst is stannous octoate (stannous bis(2-ethyl-hexanoate).

Use of co-catalysts, for example, amino compounds or carboxylic acids, such as acetic acid, with tetravalent tin compounds, for example, dibutyltin diacetate, allows for a significant reduction of the (organo)tin catalyst level. When said condensation catalysts are used, they are added in an amount preferably of from 0.01 to 20 weight parts, more preferably from 0.1 to 10 weight parts, per 100 weight parts of the silicon modified organic polymer.

Amine functional silanes added to the composition as adhesion promoters may also catalyze condensation reactions between silanes bearing hydrogen or hydrolyzable groups and hydroxysiloxy endblocked siloxane polymers.

Further compounds suitable for catalyzing condensation reactions (d) to (g) are group VIII transition metal (noble metal) compounds. The noble metal catalyst is selected from any of those well known to the art, such as those described in U.S. Pat. No. 3,923,705, said patent being hereby incorporated by reference to show platinum catalysts. A preferred platinum compound catalyst is a composition consisting essentially of the reaction product of chloroplatinic acid and an organosilicon compound containing terminal aliphatic unsaturation, such as described in U.S. Pat. No. 3,419,593, said patent being incorporated by reference. When said noble metal catalysts are used, they are added in an amount preferably of from 0.00001 to 0.5 weight parts, more preferably from 0.00001 to 0.002 weight parts, per 100 weight parts of the silicon modified organic polymer.

For example, in one condensation cure system useful in the present invention, the siloxane polymer has functional groups such as hydroxyl, condensable, or hydrolyzable group(s) attached to silicon atom(s), and the cross-linker has silicon-hydrogen bond(s). The polymer and the cross-linker are reacted in the presence of a condensation catalyst, as disclosed and described in U.S. Pat. Nos. 4,310,678, 4,782, 112, 4,962,153, and 4,978,710 which are incorporated herein by reference. The silicon hydride cross-linker can be chosen from hydrolyzable silicon hydride, polymeric or oligomeric compounds, containing hydrogen and optionally hydrolyzable or condensable groups bound directly to silicon atom(s), such as polyorganohydrogensiloxane, alkylhydrogen-cyclosiloxane, and liquid copolymers comprising $SiO_2$ and/or $SiO_{3/2}$ units and bearing silicon-bonded hydrogen radicals such as taught in U.S. Pat. No. 4,310,678, or organic polymers or resins containing Si—H groups and optionally other hydrolyzable or condensable silyl groups directly bound to carbon atom(s) via Si—C bonds. The cross-linker may also be a silsesquioxane containing hydrogen and optionally also alkoxy groups bound directly to silicon atoms, as described, for example, in U.S. Pat. No. 5,047,492, incorporated herein by reference. The hydrolyzable silicon hydride should have at least one, but not more than three hydrogen atoms bonded to silicon per molecule. It may have one or two hydrolyzable atoms or groups, such as alkoxy, bonded to silicon per molecule, such as methyldiethoxysilane. Examples of cross-linkers are trimethylsilyl endblocked polymethylhydrogensiloxane and methylhydrogencyclosiloxane. The SiH functional cross-linker is added in sufficient amount to provide at least one hydrogen atom for each hydroxyl or alkoxy group in the polydiorganosiloxane polymer. Preferably, an excess of SiH functional cross-linker is provided so that all hydroxyl or alkoxy groups can be reacted. In a typical preparation, a noble metal catalyst would be present in the composition in an amount of from 0.00001 to 0.5 parts, preferably from 0.00001 to 0.02, and more preferably from 0.00001 to 0.002 parts by weight, any other condensation catalyst would be present in the composition in an amount of from 0.01 to 10 parts by weight and preferably 0.05 to 5 parts by weight per 100 weight parts of siloxane polymer, the SiH functional cross-linker would be present in an amount of from 0.1 to 10 parts by weight per 100 parts by weight of siloxane polymer bearing hydroxyl or hydrolyzable or condensable groups.

As an alternative to the first condensation cure system, siloxane polymer having at least two silicon-hydrogen bonds can be reacted in the presence of a condensation catalyst with a cross-linker having, on average, at least two (2.0) hydroxyl or at least two (2.0) condensable or hydrolyzable groups per molecule attached directly to silicon atoms(s). In a typical preparation, the catalyst would be present in the composition in the same amount as described above, and cross-linker, depending on the type of cross-linker utilized, in an amount of from 0.1 to 50 parts by weight per 100 weight parts of silicon-hydrogen terminated siloxane polymer.

In a second useful condensation cure system, the siloxane polymer has at least two hydroxysiloxy groups, and the cross-linker has, on average, at least two (2.0) hydrolyzable OR' groups, where R' is a monovalent unsubstituted or substituted hydrocarbon radical bonded to silicon atom(s) per molecule. The siloxane polymer and cross-linker are reacted in the presence of a condensation catalyst. The cross-linker is a silane of the formula $R_xSiY_{4-x}$ where x is either 0 or 1, R can be hydrogen, a monovalent hydrocarbon radical or substituted hydrocarbon radical having less than 7 carbon atoms, such as an alkyl or alkenyl radical, a halogenated hydrocarbon, an aryl radical, a functionalized hydrocarbon radical. As used here and throughout, Y is OR', where R' can be a monovalent unsubstituted or substituted hydrocarbon radical. Suitable silanes include ethylorthosilicate, normal propylorthosilicate, mercaptopropyltrimethoxysilane, methyltrimethoxysilane, phenyltrimethoxysilane, chloropropyltrimethoxysilane, amyltriethoxysilane, g-glycidoxy-propyltrimethoxysilane, trifluoropropyltrimethoxysilane, ethyltrimethoxysilane, triethoxysilane, and vinyltrimethoxysilane. The cross-linker can also be a silsesquioxane containing alkoxy, aryloxy, alkoxyalkoxy, or alkoxyaryloxy groups bound directly to silicon atoms, as described, for example, in U.S. Pat. No. 5,047,492, incorporated herein by reference. The cross-linker may also be a linear or cyclic siloxane oligomer containing OR' groups, or an organic polymer or resin bearing Si-OR' groups and, optionally, an additional crosslinker having at least one hydrolyzable group per molecule other than OR, bound directly to silicon atom(s). The cross-linker may also be the partial hydrolysis and condensation product (dimer, trimer, tetramer, etc.) of above cross-linkers. In a typical preparation, the condensation catalyst would be present in the composition in an amount of from 0.01 to 10 parts, preferably in an amount of from 0.05 to 5 parts, and cross-linker would be present in an amount of from 0.1 to 50 parts, preferably in an amount from 1 to 10 parts, each by weight, based on 100 parts by weight of siloxane polymer.

As an alternative to the second condensation cure system, the siloxane polymer has at least two hydrolyzable OR' groups and, optionally, other hydrolyzable or condensable group(s) other than OR, bound to silicon atom(s). The polymer is then reacted in the presence of a condensation catalyst as described above with a cross-linker having, on average, at least two (2.0) hydroxyl groups per molecule bound to silicon atom(s). In a typical preparation, the catalyst would be present in the composition in an amount from 0.01 to 10 parts, preferably in an amount from 0.01 to 5 parts, and the cross-linker, depending on its nature, would be present in an amount of from 0.1 to 50 parts, preferably in an amount from 1 to 10 parts, each by weight, based on 100 parts by weight of siloxane polymer.

As a further alternative to the second condensation cure system, the siloxane polymer having at least two hydrolyzable OR' groups and, optionally, other hydrolyzable or condensable group(s) other than OR' bound to silicon atoms per molecule which can be crosslinked in the presence of a condensation catalyst as described above. In case the siloxane polymer has only two hydrolyzable OR' groups and no further hydrolyzable group(s), the presence of a cross-linker, which, on average, has at least (2.0) hydrolyzable groups per molecule bound to silicon atom(s), is required. In case the siloxane polymer has more than two hydrolyzable OR, groups or two OR' groups and further hydrolyzable group(s) other than OR' attached to silicon atoms, the presence of a cross-linker is not required. In a typical preparation, the catalyst would be present in the composition in an amount from 0.01 to 10 parts, preferably in an amount from 0.01 to 5 parts, and the additional cross-linker, if required, would be present in an amount of from 0.1 to 20 parts, preferably in an amount from 0.1 to 10 parts, each by weight, based on 100 parts by weight of siloxane polymer.

In a third condensation cure system useful to the practice of the present invention, the siloxane polymer having at least two hydroxysiloxy groups and the cross-linker having, on average, at least two (2.0) hydrolyzable acyloxy groups per molecule bonded to silicon atom(s), are reacted, optionally in the presence of a condensation catalyst, as taught in U.S. Pat. No. 5,321,075, which is incorporated herein by reference. The cross-linker can be an acyloxy silane of the formula $R_xSi(O(O)CR')_{4-x}$, where x is either 0 or 1, R can be hydrogen, a monovalent hydrocarbon radical or substituted hydrocarbon radical having less than 7 carbon atoms, such as an alkyl or alkenyl radical, a halogenated hydrocarbon, an aryl radical, a functionalized hydrocarbon radical, and R' can be hydrogen, a monovalent hydrocarbon or a monovalent substituted hydrocarbon radical Examples of suitable acyloxysilane cross-linkers include methyltriacetoxysilane, ethyltriacetoxysilane, phenyltriacetoxysilane, ethyltriacetoxysilane, phenyltriacetoxysilane, and methyltris(benzoyloxy) silane. A preferred acyloxysilane is vinyltriacetoxysilane. The acyloxysilane may also be pre-reacted with a siloxane, such as $(CH_3)_3SiO(CH_3HSiO)_x((CH_3COO)_3 SiCH_2CH_2SiCH_3O)y Si(CH_3)_3$, as disclosed in German Patent No. 2,316,184, incorporated herein by reference. The cross-linker may also be a linear or cyclic siloxane oligomer containing acyloxysiloxy groups. The cross-linker may also be a silsesquioxane containing acyloxy groups bound directly to silicon atom(s), an organic polymer or resin bearing acyloxysilyl groups and, optionally, an additional crosslinker having at least one other hydrolyzable or condensable group per molecule other than acyloxy bound directly to silicon atom(s). Cross-linker may also be a partial hydrolysis and condensation product (dimer, trimer, tetramer, etc.) of above cross-linkers. In a typical preparation, the optional catalyst would be present in the composition in an amount of from 0 to 10 parts, preferably in an amount of from 0 to 5 parts, and the cross-linker would be present in an amount of from 0.1 to 50 parts, preferably in an amount from 1 to 10 parts, each by weight, based on 100 parts by weight of siloxane polymer.

In an alternative to the third condensation cure system, the siloxane polymer having at least two hydrolyzable acyloxy groups and, optionally, other hydrolyzable or condensable group(s) other than acyloxy bound to silicon atom(s), is reacted with a cross-linker having, on average, at least two (2.0) hydroxyl groups bound to silicon atoms, optionally in the presence of a condensation catalyst. In a typical preparation, the optional catalyst would be present in the composition in an amount from 0 to 10 parts, preferably in an amount from 0 to 5 parts, and the cross-linker, depending on its nature, would be present in an amount of from 0.1 to 50 parts, preferably in an amount from 1 to 10 parts, each by weight, based on 100 parts by weight of siloxane polymer.

As a further alternative to the third condensation cure system, siloxane polymer having at least two hydrolyzable acyloxy groups and, optionally, other hydrolyzable or condensable group(s) other than acyloxy bound to silicon atom(s), which can be crosslinked, optionally, in the presence of a condensation catalyst as described above. In case the siloxane polymer has only two hydrolyzable acyloxy groups and no further hydrolyzable group(s), the presence of a cross-linker, which, on average, has at least two (2.0) hydrolyzable groups per molecule bonded to silicon atom(s), is required. In case the siloxane polymer has more than two hydrolyzable acyloxy groups or two acyloxy groups and further hydrolyzable group(s) other than acyloxy attached to silicon atoms, the presence of a cross-linker is not required. In a typical preparation, the optional catalyst would be present in the composition in an amount from 0 to 10 parts, preferably in an amount from 0 to 5 parts, and the additional cross-linker, if required, would be present in an amount of from 0.1 to 20 parts, preferably in an amount from 0.1 to 10 parts, each by weight, based on 100 parts by weight of siloxane polymer.

In a fourth condensation cure system useful to the practice of the present invention, the siloxane polymer, having at least two hydroxysiloxy groups, is reacted with a cross-linker, bearing, on average, at least two (2.0) hydrolyzable oximo groups per molecule bonded to silicon atom(s), optionally in the presence of a condensation catalyst. The system is described in detail in U.S. Pat. Nos. 4,618,642 and 4,954,565 which are incorporated herein by reference. The cross-linker can be an oximosilane of formula $RxSi(O—N=C(R'R''))_{4-x}$ where x is either 0 or 1, and R can be hydrogen, a monovalent hydrocarbon radical or substituted hydrocarbon radical having less than 7 carbon atoms, such as an alkyl or alkenyl radical, a halogenated hydrocarbon, an aryl radical, a functionalized hydrocarbon radical, and R' and R" are individually selected from the group consisting of hydrogen, monovalent hydrocarbon or monovalent substituted hydrocarbon radical Examples of suitable acyloxysilane cross-linkers include methyltris(methylethylketoximo)-silane, methyltris(dimethylketoximo)silane, methyltris(diethylketoximo) silane, vinyltris(methylethylketoximo)silane, vinyltris(methylisobutylketoximo) silane, tetra(methylisobutylketoximo)silane. The cross-linker may also be an oximosilane of the formula $R^4{}_a(R^3SiO)_bSi(ONCR^1R^2)_{4-(a+b)}$ with $R^1$, $R^2$ $R^3$ and $R^4$ independently selected from the group consisting of 1–8 carbon alkyl or fluoroalkyl, 5–6 carbon cycloalk(en)yl, 2–8 carbon alkenyl or aryl, and a is either 0 or 1, and b is either 1 or 2, as disclosed in German Patent No. 3,903,337, incorporated herein by reference. The cross-linker may also be a linear or cyclic siloxane oligomer containing oximosiloxy groups, a silsesquioxane containing oximo and, optionally, other hydrolyzable or condensable groups bound directly to silicon atoms, an organic polymer or resin bearing oximosilyl groups and, optionally, an additional crosslinker having on average at least one other hydrolyzable or condensable group per molecule other than oximo bound directly to silicon atoms. The cross-linker may also be a partial hydrolysis and condensation product (dimer, trimer, tetramer, etc) of above cross-linkers. In a typical preparation, the optional condensation catalyst, depending on its nature, would be present in the composition in an amount of from 0 to 10 parts, preferably in an amount of from 0 to 5 parts, and the cross-linker would be present in an amount of from 0.1 to 50 parts, preferably in an amount from 1 to 10 parts, each by weight, based on 100 parts by weight of siloxane polymer.

In an alternative to the fourth condensation cure system, the siloxane polymer having at least two hydrolyzable oximo groups and, optionally, other hydrolyzable or condensable group(s) other than oximo bound to silicon atom(s), is reacted with a cross-linker having, on average, at least two (2.0) hydroxyl groups per molecule bound to silicon atoms, optionally in the presence of a condensation catalyst. In a typical preparation, the optional catalyst would be present in the composition in an amount from 0 to 10 parts, preferably in an amount from 0 to 5 parts, and the cross-linker, depending on its nature, would be present in an amount of from 0.1 to 50 parts, preferably in an amount from 1 to 10 parts, each by weight, based on 100 parts by weight of siloxane polymer.

As a further alternative to the fourth condensation cure system, siloxane polymer having at least two hydrolyzable oximo groups and, optionally, other hydrolyzable or condensable group(s) other than oximo bound to silicon atom(s), which can be crosslinked, optionally, in the presence of a condensation catalyst as described above. In case the siloxane polymer has only two hydrolyzable oximo groups and no further hydrolyzable group(s), the presence of a cross-linker, which, on average, has at least two (2.0) hydrolyzable groups per molecule bonded to silicon atom(s), is required. In case the siloxane polymer has more than two hydrolyzable oximo groups or two oximo groups and further hydrolyzable group(s) other than oximo attached to silicon atoms, the presence of a cross-linker is not required. In a typical preparation, the optional catalyst would be present in the composition in an amount from 0 to 10 parts, preferably in an amount from 0 to 5 parts, and the additional cross-linker, if required, would be present in an amount of from 0.1 to 20 parts, preferably in an amount from 0.1 to 10 parts, each by weight, based on 100 parts by weight of siloxane polymer.

In a fifth condensation cure system useful to the practice of the present invention, the siloxane polymer, having at least two hydroxysiloxy groups, is reacted with a cross-linker, having, on average, at least two (2.0) hydrolyzable amino groups per molecule bonded directly to silicon atom(s), optionally in presence of a condensation catalyst. The cross-linker can be a silazane of formula $(R_nSi(NR'_2)_{4-n})$, as described in U.S. Pat. Nos. 3,032,528, 3,338,868, 3,464,951, and 3,408,325, incorporated herein by reference, where R is hydrogen, monovalent hydrocarbon radical or substituted hydrocarbon radical having less than 7 carbon atoms, functionalized hydrocarbon radicals, nitrogen compounds of the formula —N=CR'$_2$ or —NR'COR' or —NR'$_2$ or —NR", where R' is either hydrogen, monovalent hydrocarbon or monovalent substituted hydrocarbon radical, and R" is cycloalkyl radical, and n is either 0 or 1 A preferred cross-linker is methyltris(cyclohexylamine)silane. The cross-linker may also be a linear or cyclic siloxane oligomer containing aminosiloxy groups, a silsesquioxane containing amino and, optionally, other hydrolyzable or condensable groups bound directly to silicon atom(s), an organic polymer or resin bearing aminosiloxy groups and, optionally, an additional crosslinker having on average at least one other hydrolyzable or condensable group per molecule other than oximo bound directly to silicon atom(s). The cross-linker may also be a partial hydrolysis and condensation product (dimer, trimer, tetramer, etc.) of above cross-linkers. In a typical preparation, the optional condensation catalyst would be present in the composition in an amount of from 0 to 10 parts, preferably from 0 to 5 parts, and cross-linker in an amount of from 0.1 to 50 parts, preferably from 1 to 10 parts, each by weight, based on 100 weight parts of siloxane polymer.

In an alternative to the fifth condensation cure system, the siloxane polymer having at least two hydrolyzable amino groups and, optionally, other hydrolyzable or condensable group(s) other than amino bound to silicon atom(s), is reacted with a cross-linker having, on average, at least two (2.0) hydroxyl groups per molecule bound to silicon atoms, optionally in the presence of a condensation catalyst. In a typical preparation, the optional catalyst would be present in the composition in an amount from 0 to 10 parts, preferably in an amount from 0 to 5 parts, and the cross-linker, depending on its nature, would be present in an amount of from 0.1 to 50 parts, preferably in an amount from 1 to 10 parts, each by weight, based on 100 parts by weight of siloxane polymer.

As a further alternative to the fifth condensation cure system, siloxane polymer having at least two hydrolyzable amino groups and, optionally, other hydrolyzable or condensable group(s) other than amino bound to silicon atom(s), which can be crosslinked, optionally, in the presence of a condensation catalyst as described above. In case the siloxane polymer has only two hydrolyzable amino groups and no further hydrolyzable group(s), the presence of a cross-linker, which, on average, has at least two (2.0) hydrolyzable groups per molecule bonded to silicon atom(s), is required. In case the siloxane polymer has more than two hydrolyzable amino groups or two amino groups and further hydrolyzable group(s) other than amino attached to silicon atoms, the presence of a cross-linker is not required. In a typical preparation, the optional catalyst would be present in the composition in an amount from 0 to 10 parts, preferably in an amount from 0 to 5 parts, and the additional cross-linker, if required, would be present in an amount of from 0.1 to 20 parts, preferably in an amount from 0.1 to 10 parts, each by weight, based on 100 parts by weight of siloxane polymer.

In a sixth condensation cure system useful to the practice of the present invention, the siloxane polymer, having at least two hydroxysiloxy groups, is reacted with a cross-linker, having, on average, at least two (2.0) hydrolyzable aminoxy groups per molecule bonded to silicon atom(s), optionally in presence of a condensation catalyst. The cross-linker can be an aminoxysilane of the formula $R_nSi(ONR'R")_{4-n}$, a linear aminoxysiloxane of the formula $(R_3SiO(SiR_2O)_a(SiRXO)_bSiR_3)$, a cyclic aminoxysiloxane (mixture of cyclic siloxanes containing $(R_2SiO)$ and (RXSiO) units), as described in U.S. Pat. Nos. 3,441,583, 3,484,471, 3,528,941, 3,817,909, 3,839,386, 4,075,154, and Japanese Patent No. 7 6,019,728, and German Patent No. 2,640,328, incorporated herein by reference, where X is ONR'R", R is individually selected from the group consisting of hydrogen, monovalent hydrocarbon radical or substituted hydrocarbon radical having less than 7 carbon atoms, functionalized hydrocarbon radicals, nitrogen compounds of the formula —N=CR'$_2$ or —NR'COR' or —NR'$_2$ or —NR", where R' and R" are either hydrogen, a monovalent hydrocarbon or a monovalent substituted hydrocarbon radical, and R'" is a cycloalkyl radical, and n is either 0 or 1, and a is 0 or a positive integer, and b is an integer greater than 2. The cross-linker can also be a silsesquioxane containing aminoxy and, optionally, other hydrolyzable or condensable groups bound directly to silicon atoms, an organic polymer or resin bearing aminoxysilyl groups and, optionally, an additional crosslinker having an average at least one other hydrolyzable or condensable group per molecule other than aminoxy bound directly to silicon atom(s) The cross-linker can also be a partial hydrolysis and condensation product (dimer, trimer, tetramer, etc.) of above cross-linkers. In a typical preparation, the optional condensation catalyst would be present in the composition in an amount of from 0 to 10 parts, preferably from 0 to 5 parts, and cross-linker in an amount of from 0.1 to 50 parts, preferably from 1 to 10 parts, each by weight, based on 100 weight parts of siloxane polymer.

In an alternative to the sixth condensation cure system, the siloxane polymer having at least two hydrolyzable aminoxy groups and, optionally, other hydrolyzable or condensable group(s) other than aminoxy bound to silicon atom(s), is reacted with a cross-linker having, on average, at least two (2.0) hydroxyl groups per molecule bound to silicon atoms, optionally in the presence of a condensation catalyst. In a typical preparation, the optional catalyst would be present in the composition in an amount from 0 to 10 parts, preferably in an amount from 0 to 5 parts, and the cross-linker, depending on its nature, would be present in an amount of from 0.1 to 50 parts, preferably in an amount from 1 to 10 parts, each by weight, based on 100 parts by weight of siloxane polymer.

As a further alternative to the sixth condensation cure system, siloxane polymer having at least two hydrolyzable aminoxy groups and, optionally, other hydrolyzable or condensable group(s) other than aminoxy bound to silicon atom(s), which can be crosslinked, optionally, in the presence of a condensation catalyst as described above. In case the siloxane polymer has only two hydrolyzable aminoxy groups and no further hydrolyzable group(s), the presence of a cross-linker, which, on average, has at least two (2.0) hydrolyzable groups per molecule bonded to silicon atom(s), is required. In case the siloxane polymer has more than two hydrolyzable aminoxy groups or two aminoxy groups and further hydrolyzable group(s) other than aminoxy attached to silicon atoms, the presence of a cross-linker is not required. In a typical preparation, the optional catalyst would be present in the composition in an amount from 0 to 10 parts, preferably in an amount from 0 to 5 parts, and the additional cross-linker, if required, would be present in an amount of from 0.1 to 20 parts, preferably in an amount from 0.1 to 10 parts, each by weight, based on 100 parts by weight of siloxane polymer.

In a seventh condensation cure system useful to the practice of the present invention, the siloxane polymer, having at least two hydroxysiloxy groups, is reacted with a cross-linker, having, on average, at least two (2.0) hydrolyzable amido groups per molecule bonded to silicon atom(s), optionally in the presence of a condensation catalyst. The cross-linker can be an amidosilane of formula $(R_nSi(OR^1)_m(NR^2\text{---}(CO)\text{---}R^3)_{4-(n+m)})$, where R is selected from the group consisting of hydrogen, monovalent hydrocarbon radical or substituted hydrocarbon radical having less than 7 carbon atoms, functionalized hydrocarbon radicals, nitrogen compounds of the formula $—N=CR^2_2$ or $—NR^2COR^2$ or $—NR^2$ or $—NR^4$, and $R^1$ is a monovalent hydrocarbon radical, a monovalent substituted hydrocarbon radical having less than 7 carbon atoms, or a functionalized hydrocarbon radical having less than 7 carbon atoms, $R^2$ is hydrogen, or monovalent hydrocarbon or substituted hydrocarbon radicals having less than 7 carbon atoms, and R3 is monovalent aliphatic or aromatic hydrocarbon radical or substituted hydrocarbon radical having less than 7 carbon atoms, or functionalized hydrocarbon radical, and $R^4$ is a cycloalkyl radical, and n is either 0 or 1, and m either 0, 1 or 2, as described, for example, in U.S. Pat. Nos. 3,378,520, 4,985,476, optionally in the presence of a condensation catalyst. Examples of preferred cross-linkers aremethyltris (acetamido)-silane andmethylethoxybis-(N-methylbenzamido)silane. The cross-linker may also be a linear or cyclic siloxane oligomer containing amidosiloxy groups. The cross-linker may also be a silsesquioxane containing amido and, optionally, an additional crosslinker having on average at least one other hydrolyzable or condensable groups per molecule other than amido bound directly to silicon atoms, an organic polymer or resin bearing amidosilyl groups and, optionally, other hydrolyzable or condensable groups bound directly to silicon atom(s). The cross-linker may also be a partial hydrolysis and condensation product (dimer, trimer, tetramer, etc.) of above cross-linkers. In a typical preparation, the optional condensation catalyst would be present in the composition in an amount of from 0 to 10 parts, preferably from 0 to 5 parts, and cross-linker in an amount of from 0.1 to 50 parts, preferably from 1 to 10 parts, each by weight, based on 100 weight parts of siloxane polymer.

In an alternative to the seventh condensation cure system, the siloxane polymer having at least two hydrolyzable amido groups and, optionally, other hydrolyzable or condensable group(s) other than amido bound to silicon atom(s), is reacted with a cross-linker having, on average, at least two (2.0) hydroxyl groups per molecule bound to silicon atoms, optionally in the presence of a condensation catalyst. In a typical preparation, the optional catalyst would be present in the composition in an amount from 0 to 10 parts, preferably in an amount from 0 to 5 parts, and the cross-linker, depending on its nature, would be present in an amount of from 0.1 to 50 parts, preferably in an amount from 1 to 10 parts, each by weight, based on 100 parts by weight of siloxane polymer.

As a further alternative to the seventh condensation cure system, siloxane polymer having at least two hydrolyzable amido groups and, optionally, other hydrolyzable or condensable group(s) other than amido bound to silicon atom(s), which can be crosslinked, optionally, in the presence of a condensation catalyst as described above. In case the siloxane polymer has only two hydrolyzable amido groups and no further hydrolyzable group(s), the presence of a cross-linker, which, on average, has at least two (2.0) hydrolyzable groups per molecule bonded to silicon atom(s), is required. In case the siloxane polymer has more than two hydrolyzable amido groups or two amido groups and further hydrolyzable group(s) other than amido attached to silicon atoms, the presence of a cross-linker is not required. In a typical preparation, the optional catalyst would be present in the composition in an amount from 0 to 10 parts, preferably in an amount from 0 to 5 parts, and the additional cross-linker, if required, would be present in an amount of from 0.1 to 20 parts, preferably in an amount from 0.1 to 10 parts, each by weight, based on 100 parts by weight of siloxane polymer.

In an eighth condensation cure system useful to the practice of the present invention, the siloxane polymer, having at least two hydroxysiloxy groups, is reacted with a cross-linker, having, on average, at least two (2.0) hydrolyzable ureido groups per molecule bonded to silicon atom(s), optionally in the presence of a condensation catalyst. The cross-linker can be an ureido organosilane $(R_nSi(NR'\text{---}(CO)\text{---}NR''_2)_{4-n})$, where R, R' and R" are individually selected from the group consisting of hydrogen, monovalent hydrocarbon radical or substituted hydrocarbon radical having less than 7 carbon atoms, functionalized hydrocarbon radicals, and n either 0 or 1, as described, for example, in U.S. Pat. No. 3,506, 701, incorporated herein by reference. The cross-linker may also be a linear or cyclic siloxane oligomer containing ureidosiloxy groups, a silsesquioxane containing ureido and, optionally, other hydrolyzable or condensable groups bound directly to silicon atoms, an organic polymer or resin bearing ureidosilyl groups and, optionally, an additional crosslinker having on average at least one other hydrolyzable or condensable group per molecule other than ureido bound directly to silicon atom(s) The cross-linker can also be a partial hydrolysis and condensation product (dimer, trimer, tetramer, etc.) of above cross-linkers. In a typical preparation, the optional condensation catalyst would be present in the composition in an amount of from 0 to 10 parts, preferably from 0 to 5 parts, and cross-linker in an amount of from 0.1 to 50 parts, preferably from 1 to 10 parts, each by weight, based on 100 weight parts of siloxane polymer.

In an alternative to the eighth condensation cure system, the siloxane polymer having at least two hydrolyzable ureido groups and, optionally, other hydrolyzable or condensable group(s) other than ureido bound to silicon atom(s), is reacted with a cross-linker having, on average, at least two (2.0) hydroxyl groups per molecule bound to silicon atoms, optionally in the presence of a condensation catalyst. In a typical preparation, the optional catalyst would be present in the composition in an amount from 0 to 10 parts, preferably in an amount from 0 to 5 parts, and the cross-linker, depending on its nature, would be present in an amount of from 0.1 to 50 parts, preferably in an amount from 1 to 10 parts, each by weight, based on 100 parts by weight of siloxane polymer.

As a further alternative to the eighth condensation cure system, siloxane polymer having at least two hydrolyzable ureido groups and, optionally, other hydrolyzable or condensable group(s) other than ureido bound to silicon atom(s), which can be crosslinked, optionally, in the presence of a condensation catalyst as described above. In case the siloxane polymer has only two hydrolyzable ureido groups and no further hydrolyzable group(s), the presence of a cross-linker, which, on average, has at least two (2.0) hydrolyzable groups per molecule bonded to silicon atom(s), is required. In case the siloxane polymer has more than two hydrolyzable ureido groups or two ureido groups and further hydrolyzable group(s) other than ureido attached to silicon atoms, the presence of a cross-linker is not required. In a typical preparation, the optional catalyst would be present in the composition in an amount from 0 to 10 parts, preferably in an amount from 0 to 5 parts, and the additional cross-linker, if required, would be present in an amount of from 0.1 to 20 parts, preferably in an amount from 0.1 to 10 parts, each by weight, based on 100 parts by weight of siloxane polymer.

In a ninth condensation cure system useful to the practice of the present invention, the siloxane polymer, having at least two hydroxysiloxy groups, is reacted with a cross-linker, having, on average, at least two (2.0) hydrolyzable imidato groups per molecule bonded to silicon atom(s), optionally in the presence of a condensation catalyst. The cross-linker can be an imidato organosilane $(R_nSi((N{=}C(R')(OR''))_{4-n})$, where R, R', and R" are individually selected from the group consisting of hydrogen, monovalent hydrocarbon radical or substituted hydrocarbon radical having less than 7 carbon atoms, functionalized hydrocarbon radicals, and n either 0 or 1, as described, for example, in U.S. Pat. No. 3,622,529, incorporated herein by reference. The cross-linker may also be a linear or cyclic siloxane oligomer containing imidatosiloxy groups, a silsesquioxane containing imidato and, optionally, an additional crosslinker having on average at least one other hydrolyzable or condensable groups bound directly to silicon atoms, an organic polymer or resin bearing imidatosilyl groups and, optionally, an additional crosslinker baving on average at least one other hydrolyzable or condensable group per molecule other than imidato bound directly to silicon atom(s). The cross-linker can also be a partial hydrolysis and condensation product (dimer, trimer, tetramer, etc.) of above cross-linkers. In a typical preparation, the optional condensation catalyst would be present in the composition in an amount of from 0 to 10 parts, preferably from 0 to 5 parts, and cross-linker in an amount of from 0.1 to 50 parts, preferably from 1 to 10 parts, each by weight, based on 100 weight parts of siloxane polymer.

In an alternative to the ninth condensation cure system, the siloxane polymer having at least two hydrolyzable imidato groups and, optionally, other hydrolyzable or condensable group(s) other than imidato bound to silicon atom(s), is reacted with a cross-linker having, on average, at least two (2.0) hydroxyl groups per molecule bound to silicon atoms, optionally in the presence of a condensation catalyst. In a typical preparation, the optional catalyst would be present in the composition in an amount from 0 to 10 parts, preferably in an amount from 0 to 5 parts, and the cross-linker, depending on its nature, would be present in an amount of from 0.1 to 50 parts, preferably in an amount from 1 to 10 parts, each by weight, based on 100 parts by weight of siloxane polymer.

As a further alternative to the ninth condensation cure system, siloxane polymer having at least two hydrolyzable imidato groups and, optionally, other hydrolyzable or condensable group(s) other than imidato bound to silicon atom(s), which can be crosslinked, optionally, in the presence of a condensation catalyst as described above. In case the siloxane polymer has only two hydrolyzable imidato groups and no further hydrolyzable group(s), the presence of a cross-linker, which, on average, has at least two (2.0) hydrolyzable groups per molecule bonded to silicon atom(s), is required. In case the siloxane polymer has more than two hydrolyzable imidato groups or two imidato groups and further hydrolyzable group(s) other than imidato attached to silicon atoms, the presence of a cross-linker is not required. In a typical preparation, the optional catalyst would be present in the composition in an amount from 0 to 10 parts, preferably in an amount from 0 to 5 parts, and the additional cross-linker, if required, would be present in an amount of from 0.1 to 20 parts, preferably in an amount from 0.1 to 10 parts, each by weight, based on 100 parts by weight of siloxane polymer.

In a tenth condensation cure system useful to the practice of the present invention, the siloxane polymer, having at least two hydroxysiloxy groups, is reacted with a cross-linker, having, on average, at least two (2.0) hydrolyzable alkenoxy groups per molecule bonded to silicon atom(s), in the presence of a condensation catalyst. Details of the alkenoxy cure system are described in U.S. Pat. No. 5,145, 901 (incorporated by reference). The cross-linker may be an alkenoxysilane of the formula $R_nSiX_mY_{4-(n+m)}$, where X is a hydrolyzable or condensable group other than alkenoxy, and Y is alkenoxy ($-O-CR'{=}CR'_2$), where n is either 0 or 1, m is either 0 or 1, and R and R' are individually selected from the group consisting of hydrogen, monovalent hydrocarbon radical or substituted hydrocarbon radical having less than 7 carbon atoms, and functionalized hydrocarbon radicals. The cross-linker may also be a linear or cyclic siloxane or a silsesquioxane containing alkenoxysiloxy groups and, optionally, an additional crosslinker having on average at least one other hydrolyzable or condensable group per molecule other than alkenoxy bound directly to silicon atoms, an organic polymer or resin bearing alkenoxysilyl groups and, optionally, other hydrolyzable or condensable groups bound directly to silicon atom(s). The cross-linker may also be a partial hydrolysis and condensation product (dimer, trimer, tetramer, etc.) of above cross-linkers. In a typical preparation, the catalyst would be present in the composition in an amount of from 0.01 to 10 parts, preferably in an amount of from 0.01 to 5 parts, and cross-linker in an amount of from 0.1 to 50 parts, preferably in an amount from 1 to 10 parts, each by weight, based on 100 weight parts of siloxane polymer.

In an alternative to the tenth condensation cure system, the siloxane polymer having at least two hydrolyzable alkenoxy groups and, optionally, other hydrolyzable or condensable group(s) other than alkenoxy bound to silicon atom(s), is reacted with a cross-linker having, on average, at least two (2.0) hydroxyl groups per molecule bound to silicon atoms, in the presence of a condensation catalyst. In a typical preparation, the catalyst would be present in the composition in an amount from 0.01 to 10 parts, preferably in an amount from 0.01 to 5 parts, and the cross-linker, depending on its nature, would be present in an amount of from 0.1 to 50 parts, preferably in an amount from 1 to 10 parts, each by weight, based on 100 parts by weight of siloxane polymer.

As a further alternative to the tenth condensation cure system, siloxane polymer having at least two hydrolyzable alkenoxy groups and, optionally, other hydrolyzable or condensable group(s) other than alkenoxy bound to silicon atom(s), which can be crosslinked, in the presence of a condensation catalyst as described above. In case the siloxane polymer has only two hydrolyzable alkenoxy groups and no further hydrolyzable group(s), the presence of a cross-linker, which, on average, has at least two (2.0) hydrolyzable groups per molecule bonded to silicon atom(s), is required. In case the siloxane polymer has more than two hydrolyzable alkenoxy groups or two alkenoxy groups and further hydrolyzable group(s) other than alkenoxy attached to silicon atoms, the presence of a cross-linker is not required. In a typical preparation, the catalyst would be present in the composition in an amount from 0.01 to 10 parts, preferably in an amount from 0.01 to 5 parts, and the additional cross-linker, if required, would be present in an amount of from 0.1 to 20 parts, preferably in an amount from 0.1 to 10 parts, each by weight, based on 100 parts by weight of siloxane polymer.

In a eleventh condensation cure system useful to the practice of the present invention, the siloxane polymer having at least two hydroxysiloxy groups, is reacted with a cross-linker, having, on average, at least two (2.0) hydrolyzable isocyanato per molecule groups bonded to silicon atom(s), in the presence of a condensation catalyst. The cross-linker may be a isocyanato organosilane of the formula $R_nSi(OR')_m(NCO)_{4-(m+n)}$, as described in German Patent No. 2,653,498 and Japanese Patent No. 57,168,946, both patents being incorporated herein by reference, where R is hydrogen, monovalent hydrocarbon radical or substituted hydrocarbon radical having less than 7 carbon atoms, functionalized hydrocarbon radicals, nitrogen compounds of the formula —N=CR"$_2$ or —NR"COR" or —NR"$_2$ or —NR'". R' is monovalent hydrocarbon or substituted hydrocarbon radicals having less than 7 carbon atoms. R" is either hydrogen, monovalent hydrocarbon radicals having less than 7 carbon atoms, R'" is cycloalkyl radical, and n is either 0 or 1, and m is either 0, 1 or 2. The cross-linker may also be a linear or cyclic siloxane oligomer containing isocyanatosiloxy groups, a silsesquioxane containing isocyanato and, optionally, an additional crosslinker having on average at least one other hydrolyzable or condensable group per molecule other than isocyanato bound directly to silicon atoms, an organic polymer or resin bearing isocyanatosilyl groups and, optionally, other hydrolyzable or condensable groups bound directly to silicon atom(s). The cross-linker may also be a partial hydrolysis and condensation product (dimer, trimer, tetramer, etc) of above cross-linkers. In a typical preparation, the condensation catalyst would be present in the composition in an amount of 0.01 to 10 parts, preferably in an amount of from 0.01 to 5 parts, the cross-linker would be present in an amount of from 0.1 to 50 parts, preferably in an amount from 1 to 10 parts, each by weight, based on 100 weight parts of siloxane polymer.

In an alternative to the eleventh condensation cure system, the siloxane polymer having at least two hydrolyzable isocyanato groups and, optionally, other hydrolyzable or condensable group(s) other than isocyanato bound to silicon atom(s), is reacted with a cross-linker having, on average, at least two (2.0) hydroxyl groups per molecule bound to silicon atoms, in the presence of a condensation catalyst. In a typical preparation, the catalyst would be present in the composition in an amount from 0.01 to 10 parts, preferably in an amount from 0.01 to 5 parts, and the cross-linker, depending on its nature, would be present in an amount of from 0.1 to 50 parts, preferably in an amount from 1 to 10 parts, each by weight, based on 100 parts by weight of siloxane polymer.

As a further alternative to the eleventh condensation cure system, siloxane polymer having at least two hydrolyzable isocyanato groups and, optionally, other hydrolyzable or condensable group(s) other than isocyanato bound to silicon atom(s), which can be crosslinked, in the presence of a condensation catalyst as described above. In case the siloxane polymer has only two hydrolyzable isocyanato groups and no further hydrolyzable group(s), the presence of a cross-linker, which, on average, has at least two (2.0) hydrolyzable groups per molecule bonded to silicon atom(s), is required. In case the siloxane polymer has more than two hydrolyzable isocyanato groups or two isocyanato groups and further hydrolyzable group(s) other than isocyanato attached to silicon atoms, the presence of a cross-linker is not required. In a typical preparation, the catalyst would be present in the composition in an amount from 0.01 to 10 parts, preferably in an amount from 0.01 to 5 parts, and the additional cross-linker, if required, would be present in an amount of from 0.1 to 20 parts, preferably in an amount from 0.1 to 10 parts, each by weight, based on 100 parts by weight of siloxane polymer.

In a twelfth condensation cure system useful for the practice of this invention, the siloxane polymer, having at least two hydroxysiloxy or alkoxysiloxy groups, is reacted with a cross-linker, bearing, on average, at least two (2.0) reactive silanol groups, in presence of a condensation catalyst. The cross-linker is selected from the group consisting of silica, silicate, siliconate, silanolate, silanol functional silicone resins, and silanol functional organic resins. Siliconates and silanolates useful for this invention can be represented by the formulae $RSi(O^-M^+)_n(OH)_{3-n}$ and $R_2Si(OM)_m(OH)_{2-m}$, respectively, where R is monovalent hydrocarbon radical, substituted hydrocarbon radical having less than 7 carbon atoms, or functionalized hydrocarbon radical, and M is selected from the group consisting of an alkali metal cation, an ammonium group, and a phosphonium group, and n is an integer or fraction having value of from 0.1 to 3, and m is an integer or fraction having a value of from 0.1 to 2. The cross-linker may also be a partial condensation product (dimer, trimer, tetramer, etc) of the above cross-linkers. Crosslinking of hydroxysiloxy endblocked siloxanes with siliconates of formula $RSi(O^-M^+)_m(OH)_{3-m}$ in emulsions is described, for example, in U.S. Pat.

No. 4,816,506, incorporated herein by reference. After the high solids gel consisting of hydroxysiloxy endblocked siloxane, surfactant and water, is formed, a cross-linker selected from the group consisting of silica, silicate, siliconate, silanolate, silanol functional organic resin or silicone resin, and a condensation catalyst, such as dibutyltindilaurate, are added to the emulsion. This type of crosslinking reaction is well known in the art, and described in U.S. Pat. Nos. 4,221,688, 4,244,849, 4,273,813, 5,004,771, 3,355,406, which are incorporated herein by reference. In a typical preparation, the condensation catalyst would be present in the composition in an amount of from 0.01 to 10 parts, preferably in an amount of from 0.01 to 5 parts, and the cross-linker would be present in an amount of from 0.1 to 50 parts, preferably in an amount from 1 to 30 parts, each by weight, based on 100 weight parts of siloxane polymer.

The crosslinker(s) or cure by-product(s) of certain condensation cure systems can act as catalyst or co-catalyst to other condensation cure systems. Examples of such co-catalysis are a mixture of silazane crosslinker and oximosilane crosslinker or a silane crosslinker which bears both amino and oximo functionalities, as described in U.S. Pat. Nos. 3,742,004, 3,758,441 and 4,191,817. Both systems are capable of crosslinking hydroxysiloxy functional organic polymer without the presence of a further catalyst. Another example is a silane bearing both amino and alkoxy functionalities, such as in $CH_3(C_2H_5O)Si(NHCH_2CH_2CH_2Si(OC_2H_5)_3)_2$, disclosed in U.S. Pat. No. 4,458,055, incorporated herein by reference. Another example of such co-catalysis is the condensation reaction between an alkoxysilane and a hydroxysiloxy functional organic polymer, or between two alkoxysiloxy functional organic polymers, catalyzed by an acetoxysilane crosslinker in presence of a primary tin condensation catalyst, as described in U.S. Pat. Nos. 3,293,204 and 4,515,932, as well as in "Bifunctional catalysis in the condensation of silanols and alkoxysilanes" by Hsien-Kun Chu, Robert P. Cross, and David I. Crossan in *Journal of Organometallic Chemistry*, 425 (1992), pages 9–17. Combining various condensation cure chemistries, thus, may be advantageous.

The following class of cure systems that do not generate volatile by-products ("tethered leaving groups") is useful in the practice of the current invention.

In the first non-volatile cure system useful for the practice of this invention, the siloxane polymer has at least two hydroxysiloxy groups, and the cross-linker has, on average, at least two (2.0) silacycloalkane groups per molecule. The siloxane polymer and the cross-linker are reacted in the presence of a nucleophilic catalyst, such as an amine, a hydroxyl amine, a guanidine, a N-alkylated guanidine, an urea, or a N-alkylated urea. The preferred catalyst is a dialkylhydroxylamine. The most preferred catalyst is diethylhydroxylamine. The silacycloalkane cure system is described in detail in U.S. Pat. Nos. 4,965,367, 4,985,568, 5,001,187, 5,049,688, 5,110,967, and European Patent Nos. 0,423,684 and 0,423,685, all patents being incorporated herein by reference. The cross-linker can be a compound bearing silacycloalkane groups —(Si(CH2)n), the preferred cross-linker is a compound bearing silacyclobutane groups. The silacycloalkane group(s) may be attached to the cross-linker via Si—C, Si—(O—Si)$_n$—Si, or Si—(O—Si)$_n$—C bonds, wherein n is a positive integer. The cross-linker may also be a linear or cyclic siloxane containing silacycloalkane radicals, a silsesquioxane containing silacycloalkane radicals, an organic oligomer, polymer or resin bearing silacycloalkane groups directly bound to silicon or carbon atom(s). In a typical preparation, the catalyst would be present in the composition in an amount of from 0.01 to 10 parts, preferably in an amount of from 0.1 to 5 parts, and the cross-linker would be present in an amount of from 0.1 to 50 parts, preferably in an amount from 1 to 10 parts, each by weight, based on 100 parts by weight of siloxane polymer.

In an alternative to the first non-volatile cure system, the siloxane polymer has at least two silacycloalkane groups. The polymer is then reacted in the presence of a nucleophilic catalyst, as described above, with a cross-linker having, on average, at least two hydroxyl groups per molecule bound to silicon atoms. In a typical preparation, the catalyst would be present in the composition in an amount from 0.01 to 10 parts, preferably in an amount from 0.1 to 5 parts, and the cross-linker, depending on its nature, would be present in an amount of from 0.1 to 50 parts, preferably in an amount from 1 to 10 parts, each by weight, based on 100 parts by weight of siloxane polymer.

In a further alternative to the first non-volatile cure system, the siloxane polymer having at least two silacycloalkane groups and, optionally, other hydrolyzable or condensable group(s) other than silacycloalkane bound to silicon atoms, which can be crosslinked in the presence of a nucleophilic catalyst, as described above. In case the polymer has only two silacycloalkane groups and no further hydrolyzable group(s), the presence of a cross-linker, which, on average, has at least two (2.0) hydrolyzable groups per molecule bonded to silicon atom(s), is required. In case the polymer has more than two silacycloalkane groups or two silacycloalkane groups and further hydrolyzable group(s) attached to silicon atoms, the presence of a cross-linker is not required. In a typical preparation, the catalyst would be present in the composition in an amount from 0.01 to 10 parts, preferably in an amount from 0.1 to 5 parts, and the additional cross-linker, if required, would be present in an amount of from 0.1 to 20 parts, preferably in an amount from 0.1 to 10 parts, each by weight, based on 100 parts by weight of siloxane polymer.

In the second non-volatile cure system useful to the practice of the present invention, the siloxane polymer having at least two hydroxysiloxy groups, is reacted with a cross-linker having, on average, at least two (2.0) aza-silacycloalkane groups, in the presence of a condensation catalyst. The aza-silacycloalkane cure system is described in detail in U.S. Pat. Nos. 5,136,064, 5,238,988, 5,239,099, 5,254,645, and World Patent No. 94/14820, all patents being incorporated herein by reference. The cross-linker can be a compound bearing aza-silacyclopentane groups attached via the silicon or nitrogen atom. The preferred cross-linker is a compound bearing aza-silacyclopentane groups. The cross-linker may also be a linear or cyclic siloxane, a silsesquioxane, an organic oligomer, polymer or resin, bearing aza-silacycloalkane radicals. In a typical preparation, the catalyst would be present in the composition in an amount of from 0.01 to 10 parts, preferably in an amount of from 0.1 to 5 parts, and the cross-linker would be present in an amount of from 0.1 to 50 parts, preferably in an amount from 1 to 10 parts, each by weight, based on 100 parts by weight of siloxane polymer.

In an alternative to the second non-volatile cure system, the siloxane polymer has at least two aza-silacycloalkane groups, attached to the polymer either via the silicon or nitrogen atom The polymer is then reacted in the presence of a condensation catalyst, as described above, with a cross-linker having, on average, at least two (2.0) hydroxyl groups bound to silicon atoms In a typical preparation, the catalyst would be present in the composition in an amount from 0.01 to 10 parts, preferably in an amount from 0.1 to 5 parts, and the cross-linker, depending on its nature, would be present in an amount of from 0.1 to 50 parts, preferably in an amount from 1 to 10 parts, each by weight, based on 100 parts by weight of siloxane polymer.

As a further alternative to the second non-volatile cure system, the siloxane polymer having at least two aza-silacycloalkane groups, bound to the polymer via either the silicon or nitrogen atom, and, optionally, other hydrolyzable or condensable group(s) other than aza-silacycloalkane bound to silicon atom(s), can be crosslinked in the presence of a condensation catalyst, as described above. In case the polymer has only two aza-silacycloalkane groups and no further hydrolyzable group(s) attached to silicon atoms, the presence of a cross-linker, which, on average, has at least two (2.0) hydrolyzable groups per molecule bonded to silicon atom(s), is required. In case the polymer has more than two aza-silacycloalkane groups or two aza-silacycloalkane groups and further hydrolyzable group(s) attached to silicon atom(s), the presence of a cross-linker is not required. In a typical preparation, the catalyst would be present in the composition in an amount from 0.01 to 10 parts, preferably in an amount from 0.1 to 5 parts, and the additional cross-linker, if required, would be present in an amount of from 0.1 to 20 parts, preferably in an amount from 0.1 to 10 parts, each by weight, based on 100 parts by weight of siloxane polymer.

Another class of silicon cure systems involves addition (hydrosilylation) reactions between a siliconhydride (Si—H) group and an alkenyl group (—(CH$_2$)$_n$—CH=CH$_2$) group. The silicon hydride group may be attached either to the polymer or the cross-linker The alkenyl group may be attached either to the polymer or the cross-linker. If the alkenyl group is attached to the crosslinker, the crosslinker may be organic, silicon modified organic, or siloxane in nature.

The number of reactive radicals on the polymer and the cross-linker determine, whether a cured elastomer is obtained. An elastomeric network is being formed by the addition cure, if the sum of the reactive radicals on the polymer and the reactive radicals on the cross-linker is at least 5. For example, if the polymer has two alkenyl groups and the cross-linker has three silicon hydride groups an elastomer is obtained.

The addition cure chemistry requires a catalyst to effect the reaction between polymer and crosslinking compound. Suitable hydrosilylation catalysts are well know in the art. Examples of suitable catalysts preferably employed in the addition reactions (a) to (c) are group VIII transition metal (noble metal) compounds The noble metal catalyst is selected from any of those well known to the art, such as those described in U.S. Pat. No. 3,923,705, said patent being hereby incorporated by reference to show platinum catalysts. A preferred platinum compound catalyst is a composition consisting essentially of the reaction product of chloroplatinic acid and an organosilicon compound containing terminal aliphatic unsaturation, such as described in U.S. Pat. No. 3,419,593, said patent being incorporated by reference. When said noble metal catalysts are used, they are added in an amount from 0.000001 to 0.5 parts, preferably from 0.00001 to 0.02, and more preferably from 0.00001 to 0.002 weight parts, per 100 weight parts of the silicon modified organic polymer.

In the first addition cure system useful to the practice of the present invention, the siloxane polymer bearing alkenyl groups, is reacted with a crosslinker, having, on average, at least two (2.0) silicon-bonded hydrogen atoms per molecule, the reaction occurring in the presence of a hydrosilylation catalyst. Details of this cure system are taught in U.S. Pat. No. 4,248,751 which is incorporated herein by reference. The siloxane polymer contains at least one alkenyl group. However, in order to obtain sufficient curability, it is desirable that the siloxane polymer contains at least 1.1, more preferably from 1.5 to 4 reactive alkenyl groups. The silicon hydride cross-linker can be chosen from hydrolyzable silicon hydride, polymeric or oligomeric compounds, containing, on average, at least two (2.0) hydrogen-silicon bonds and optionally hydrolyzable or condensable groups bound directly to silicon atoms, such as polyorganohydrogensiloxane, alkylhydrogencyclosiloxane, and liquid copolymers comprising SiO$_2$ and/or SiO$_{3/2}$ units and bearing silicon-bonded hydrogen radicals such as taught in U.S. Pat. No. 4,310,678. The silicon hydride cross-linker can also be chosen from organic polymers and resins bearing Si—H groups. The cross-linker may also be a silsesquioxane containing hydrogen and optionally also alkoxy groups bound directly to silicon atoms, as described, for example, in U.S. Pat. No. 5,047,492, incorporated herein by reference. Examples of cross-linkers are trimethylsilyl endblocked polymethylhydrogensiloxane and methylhydrogencyclosiloxane. The SiH functional cross-linker is added in sufficient amount to provide at least one hydrogen atom for each vinyl group in the polydiorganosiloxane polymer. Preferably, an excess of SiH functional cross-linker is provided so that all vinyl groups can be reacted. In a typical preparation, the catalyst would be present in the composition in an amount of from 0.000001 to 0.5 parts, preferably from 0.00001 to 0.02 parts, and silicon hydride cross-linker, depending on its nature, in an amount of from 0.1 to 10 parts, each by weight, of siloxane polymer.

In an alternative to the first addition cure system, the hydrosilylation reaction takes place, in presence of a hydrosilylation catalyst, between a siloxane polymer having silicon-hydrogen bonds and a crosslinker having alkenyl groups attached to silicon or carbon atoms(s) The siloxane polymer contains at least one silicon-hydrogen bond. However, in order to obtain sufficient curability, it is desirable that the siloxane polymer contains at least 1.1, more preferably from 1.5 to 4 reactive silicon-hydrogen bonds. The cross-linker has, on average, at least two (2.0) alkenyl groups per molecule directly attached to at least one silicon atom, and can be selected from the group consisting of trisalkenylsilanes, alkenyl functional linear or cyclic siloxanes, liquid copolymers comprising SiO$_2$ and/or SiO$_{3/2}$ units and bearing silicon bonded alkenyl groups, silsesquioxane containing alkenyl and optionally hydrolyzable or condensable groups, that do not interfere with the noble metal catalyzed cure and are bound directly to silicon atoms, organic polymers or resins having alkenylsilyl groups and optionally hydrolyzable or condensable silyl groups, that do not interfere with the noble metal catalyzed cure bound directly to carbon atom(s) via Si—C bonds, or organic oligomers, polymers or resins bearing alkenyl groups. The cross-linker is added to the composition in such an amount as to provide at least one hydrogen atom on the siloxane polymer for each alkenyl in the cross-linker. In a typical preparation, the catalyst would be present in the composition in an amount of from 0.000001 to 0.5 parts, preferably from 0.00001 to 0.02 parts, and silicon hydride cross-linker, depending on its nature, in an amount of from 0.1 to 10 parts, each by weight, of siloxane polymer.

In another class of cure systems useful in the practice of the present invention, the crosslinking between Si—C bonds occurs via free radical reactions. In one example of this cure system a stabilized emulsion of hydroxysiloxy or trimethylsiloxy endblocked siloxane in water is reacted with siloxane containing sufficient alkenyl substituted siloxane units to facilitate the crosslinking using a peroxide or other free radical initiator, or high energy radiation, as described in U.S. Pat. No. 4,273,634 which is incorporated herein by reference. In a typical preparation, the free radical initiator would be present in the composition in an amount of from 0.01 to 10 parts by weight of siloxane polymer.

The following class of miscellaneous organic cure systems is useful to the practice of the current invention.

In the first organic cure system useful to the practice of the present invention, the siloxane polymer, bearing at least two carboxyalkylsiloxy groups, is reacted with a cross-linker, having, on average, at least two epoxide groups; the reaction occurring in presence of a catalyst, as disclosed in U.S. Pat. No. 4,623,694, incorporated herein by reference. The cross-linker can be an epoxide compound selected from the group consisting of diglycidyl ethers of di- and bis-phenols. The catalyst is selected from the group consisting of (organo) metallic compounds, amino compounds, salts of amino compounds, or mixtures of catalysts. In a typical preparation, the catalyst would be present in the composition in an amount of 0.01 to 10 parts, preferably in an amount of from 0.01 to 5 parts, and the cross-linker would be present in an amount of from 2 to 100 parts, preferably in an amount from 5 to 50 parts, each by weight, based on 100 weight parts of siloxane polymer.

In another organic cure system useful to the practice of the present invention, the siloxane polymer, bearing at least two primary or secondary aminosiloxy groups, is reacted with a cross-linker, having, on average, at least two carboxylic anhydride groups; and the reaction optionally occurring in the presence of an acrylating agent, as disclosed in German Patent No. 4,211,256, incorporated herein by reference. The cross-linker is either an alkoxysilane, an alkoxysiloxane, or an alkoxysiloxy or alkoxysilyl functional resin, or a siloxane containing carboxylic anhydride groups. Depending on the number of amino and carboxy groups involved in the reaction, in a typical preparation the catalyst would be present in the composition in an amount of 0.01 to 5 parts, preferably in an amount of from 0.05 to 2 parts, the cross-linker would be present in an amount of from 0.1 to 100 parts, preferably in an amount from 1 to 50 parts, each by weight, based on 100 weight parts of siloxane polymer.

Fillers

Fillers may be optionally added to the composition of the invention. Depending on the type of filler under consideration and the intended purpose of the filler addition, the filler may be added to the initial mixture of siloxane polymer, surfactant, and water, optionally also containing cross-linker and catalyst and optional formulation ingredients; it may be added after the initial emulsification step to the high solids gel phase; or it may be added to the silicone latex dispersion after dilution with water. The filler may be added neat (dry) or as a dispersion (slurry) in water, siloxane polymer, polymer/mixture, solvent/polymer mixture, solvent, or other suitable media. Fillers may be added for reinforcing or extending (cheapening) the cured elastomer, or for achieving special performance characteristics of the wet silicone latex dispersion or the cured elastomer, exemplified, but not limited to, such properties as handling characteristics, electrical conductivity, fire resistance, self-extinguishing feature, radiation shielding, or changes in the surface appearance or characteristics of the. Any filler which does not react with the silicone emulsion or silicone latex dispersion is suitable.

Fillers added for extending or reinforcing purposes typically have an average particle size below 10 micrometers, preferably below 2 micrometers, and are added at 10 to 200 weight parts, preferably 40 to 120 weight parts, per 100 weight parts of siloxane polymer. Examples of such fillers are aluminum oxide, hydrated aluminum hydroxide, diatomaceous earths, magnesium hydroxide, ground quartz, mica, calcium carbonate, clay, barium sulfate, zinc oxide, iron oxide, and talcum. If necessary, liquid alkoxy silanes which are soluble in the siloxane polymer may be added with the filler to compatibilize the filler with the siloxane polymer.

Various pigments, such as carbon black or titanium dioxide, may also be added as fillers. Since these fillers are only intended to affect the color of the cured silicone latex elastomer, they are typically added at 0.1 to 20 weight parts, preferably from 0.5 to 10 weight parts, per 100 weight parts of siloxane polymer. Titanium dioxide has been found to be particularly useful as an ultraviolet light screening agent.

It should be noted that selection and addition to the composition of particular fillers, may improve the physical properties of the resulting elastomer, particularly tensile property, elongation property, hardness and heat stability Precipitated or fumed silicas may be used as reinforcing fillers. The silicone latex dispersions of this invention which are cured with catalysts other than Sn(IV) compounds are particularly useful, because they can be reinforced with colloidal silicas without negatively effecting the shelf-life of the wet latex dispersion and/or the durability of the cured elastomer. Although common fumed and precipitated silicas can be used, colloidal silicas are much more effective in reinforcing the cured silicone latex elastomers. Aqueous dispersions of fumed or precipitated colloidal silicas are commercially available. Stable dispersions of fumed silica in water are available at a pH varying from 5 to 11. The amount of fumed silica in the dispersion varies from about 10 to about 30 percent by weight. Such fumed silica dispersions are available from CABOT Corporation under the trademark Cab-o-Sphere (R). The dispersions are stated to be stabilized with ammonia, sodium or potassium hydroxide. The above described dispersions of fumed silica are different from the aqueous sodium, ammonium, or aluminum ion stabilized sols of colloidal silica, such as described in U.S. Pat. No. 4,221,688. The colloidal silicas sols are commercially available from NALCO Chemical Company (Naperville, Ill.). Use of fumed silica dispersions and colloidal silica sols for reinforcement of silicone latex dispersions are described in U.S. Pat. Nos. 5,162,429 and 5,321,075, incorporated herein by reference. Elastomers made from silicone latices cured with catalysts other than Sn(IV); stabilized with surfactants, which are not or do not form species capable of catalyzing siloxane redistribution/degradation reactions, even when exposed to temperatures above 100 C; and containing ammonium stabilized silicas are heat stable up to temperatures of 200 C (long-term) and 250 C (short term). Elastomers made from silicone latex dispersions containing sodium stabilized silicas are not heat stable at temperatures above 120 C (short term) and 150 C (long-term). Acidic silicas (those containing H+ as a stabilizer), also yield heat stable elastomers. In general, colloidal or dispersed silicas which are not stabilized by Group Ia or IIa elements, yield heat stable elastomers. It is anticipated that silicas stabilized with other volatile bases, such as volatile organic amines, should provide similar heat stability of the silicone latex elastomer as achieved with ammonium stabilized colloidal or dispersed silicas. Suitable organic amines are of the formulae $(R)_{3-x}N(H)x$, where $x=0$, 1, 2, or 3, R is alkyl or aryl group, such as in $N(CH_2CH_2OH)_3$ or $NH(CH_2CH_2OH)_2$. The volatile organic amines include cyclohexylamine, triethylamine, dimethylaminomethylpropanol, diethylaminoethanol, aminomethyl propanol, amino butanol, monoethanolamine, monoisopropanolamine, dimethylethanolamine, diethanolamine, aminoethylpropanediol, aminomethylpropanediol, diisopropanolamine, morpholine, tris(hydroxymethyl)aminomethane, triisopropanolamine, triethanolamine, aniline, and urea.

Non-siliceous filler are preferably used in silicone latex dispersions of this invention cured with Sn(IV) compounds as catalyst, since they do not negatively affect the shelf-life of the wet latex dispersion and/or the durability of the cured elastomer. Precipitated surface treated calcium carbonates can be used as semi-reinforcing fillers, ground calcium carbonates, either treated or untreated, can be used as extending fillers.

Fillers which may be used to modify the surface appearance of the cured silicone latex elastomer and/or to improve the workability of the wet latex dispersion include fibers of 0.1 to 100 millimeters length. The fiber may be selected from the group consisting of natural fibers, regenerated fibers, and synthetic fibers. Natural fibers include pulp, cotton, flax, silk, and wool. Regenerated fibers are such as rayon. Synthetic fibers include nylon and polyester.

Fillers which may be used to achieve fire retardency or fire resistance of the cured silicone latex elastomer include aluminum hydroxide (trihydrate), non-flammable fibers, ceramic or glass fibers or microspheres, and vermiculite, as described in U.S. Pat. No. 4,719,251, incorporated herein by reference.

Fillers which may be used to achieve electric conductivity of the cured silicone latex elastomer include carbon black, metal coated ceramic spheres or fibers, metal coated glass spheres or fibers, uncoated or metal coated graphite fibers or spheres as disclosed in U.S. Pat. Nos. 4,545,914 and 4,547,312, incorporated herein by reference.

Resin Reinforces

The silicone latex dispersion of this invention can also be reinforced with silsesquioxanes, for instance a methylsilsesquioxane having the unit formula $RSiO_{3/2}$, which is prepared in an emulsion. The process of making these silsesquioxanes, having colloidal sized particles is found in U.S. Pat. No. 3,433,780, incorporated herein by reference. The silsesquioxanes can be employed in the form of colloidal suspensions, which are added to the silicone emulsion (made from siloxane polymer, surfactant, and water) or the crosslinked latex (made from siloxane polymer, surfactant, cross-linker, water, and, if required, catalyst). Copolymers and blends of the silsesquioxanes can be employed as well as the individual ones and the formula $RSiO_{3/2}$ is intended to include all such materials.

Catalyst Deactivation

For certain condensation cure chemistries and compositions in which the catalyst remains active and negatively affects shelf-life of the wet dispersion and/or durability of the cured elastomer, it may be desirable to add compounds to the instant composition that deactivate (poison) the catalyst after the cure have sufficiently progressed. In this process, a sufficient "gestation time" of typically several days needs to be allowed before the catalyst can be quenched. Deactivation of Sn(IV) catalysts with alkyl mercaptan, 8-quinolinol, thio glycolic acid, and salts of thio glycolic acid has been disclosed in U.S. Pat. No. 4,609,486, incorporated herein by reference.

Stabilizers

For certain condensation cure chemistries and compositions in which the catalyst remains active and negatively affects shelf-life of the wet dispersion, it may be desirable to add compounds to the instant composition that act as shelf life stabilizers. Amine compounds, such as diethylamine, hydroxylamine, or 2-amino-2-methyl-1-propanol have been found to improve the shelf life (stability of properties) of the wet silicone latex dispersions containing Sn(IV) catalysts and silicas. The preferred shelf life stabilizer is 2-amino-2-methyl-1-propanol, as disclosed in U.S. Pat. Nos. 4,427,811 and 4,608,412, incorporated herein by reference.

Other Additives

The silicone latex dispersion of the present invention may contain additional ingredients to further modify the properties of the latex dispersion or the cured elastomeric products obtained from the latex dispersion. For example, antifoams, dispersants, or freeze/thaw stabilizers may be added to the dispersion.

Articles, Uses

The silicone latex dispersions can be applied as sealants, putties, molding materials, or foams. The evaporation of water from the dispersion normally occurs by unattended exposure to the ambient atmosphere. The evaporation may be additionally assisted by a flow of dry air or other gas, either at ambient temperature or at elevated temperatures, by infrared heating, micro-waving, or a combination of various means. Care should be taken when accelerated means are used to evaporate the aqueous phase that the rapidly leaving water vapor does not produce undesired discontinuities in the cured product.

EXAMPLES

The following examples are presented to further illustrate the compositions of this invention, but are not to be construed as limiting the invention, which is delineated in the appended claims. In the following examples, the aforesaid wet dispersions were cast into films one day after the dispersions were made, and the film was allowed to dry for a minimum of seven days prior to testing. Durometer results were obtained by the method described in ASTM C661 "Indentation Hardness of Elastomeric-Type Sealants by Means of a Durometer". Tensile and elongation results were obtained by the method described in ASTM D412 "Vulcanized Rubber and Thermoplastic Rubbers and Thermoplastic Elastomers-Tension" using dumbbell specimens with an L dimension equal to 0.5 inch.

Example 1

Using parts by weight based on siloxane polymer, 100 parts of 50,000 cs (110,000 Mw) —OH endblocked polydimethylsiloxane ("PDMS") and 4 parts of a 50/50 by weight mixture of water and Tergitol TMN-6 surfactant, an ethoxylated trimethylnonanol, were mixed in a laboratory mixer (Whip Mix) until a very high solids gel emulsion was formed. The aqueous Tergitol TMN-6 solution had a viscosity of 0.082 Pa-s at a shearing gradient of 1 $sec^{-1}$ as measured on a Brookfield viscometer (Brookfield Engineering Laboratories, Inc, Stoughten, Mass. The emulsion was diluted with water to 95% silicone polymer solids. This process was repeated with final dilutions of 90, 85, 80, 75, and 70% silicone polymer solids being prepared 0.2 parts dibutyltindilaurate catalyst and 0.8 part isobutyltrimethoxysilane were mixed in to each of these emulsions. The formulations were transferred to a semkit cartridge (Courtaulds Aerospace, Indianapolis, Ind.) and left to stand overnight. The next day a small amount of each sample was spread out to dry. The extrusion rate was measured by extruding the sample from the semkit through a ⅛" orifice at a constant pressure of 32 psi and weighing the amount extruded. A tack-free elastomer remained after the evaporation of water.

| % Si Polymer solids | Extrusion rate (grams per minute) |
| --- | --- |
| 95 | 3.9 |
| 90 | 19.8 |
| 85 | 222.2 |
| 80 | 1228.8 |
| 75 | 4376.1 |
| 70 | 6193.5 |

Example 2

Using parts by weight based on siloxane polymer, 2 parts of a 50% aqueous solution of sodium lauryl sulfate was mixed into 100 parts of 50,000 cs (Mw 110,000) —OH endblocked PDMS polymer in a laboratory mixer (Whip mix) (Whip Mix Corporation, Louisville, Ky.). This emulsion gel was diluted with 20.25 parts of water. 0.42 parts of stannous octoate, 0.96 parts of chloropropyltrimethoxysilane, and 0.52 parts of 2-amino-2-methyl-1-propanol (95% solution) were mixed sequentially into the emulsion. This dispersion has good handling properties. Specifically, this dispersion exhibited greater resistance to extrusion and tooling than a 75% solids silicone dispersion prepared from a crosslinked emulsion polymer. It formed a silicone elastomer after water evaporation with a tensile strength of 75 psi and an elongation of 1929%.

Example 3

11.2 parts of a 50/50 solution of sodium lauryl sulfate and water was added to 100 parts of a 60,000 mPa.s trimethoxysilane endblocked PDMS polymer in a laboratory mixer (Whip mix). The ingredients were mixed until a high solids emulsion gel was formed. An additional 13 parts of water and 0.5 parts of Cotin S-10 stannous octoate were mixed in. This dispersion had good handling properties and formed a silicone elastomer after water evaporation. Specifically this dispersion exhibited greater resistance to extrusion and tooling than a 75% solids silicone dispersion prepared from a crosslinked silicone emulsion polymer.

Example 4

Using parts by weight based on siloxane polymer, 6.2 parts of Makon 10, an alkylphenoxy polyoxyethylene ethanol, nonionic surfactant and 3.0 parts of water were added to 100 parts of 50,000 cs (Mw 110,000) —OH endblocked PDMS polymer. The aqueous Makon 10 solution had a viscosity of 5.35 Pa-s at a shearing gradient of 1 sec$^{-1}$ as measured on a Brookefield viscometer (Brookfield Engineering Laboratories, Inc., Stoughten, Mass. In a laboratory mixer (whip mix) these ingredients were mixed until a very high solids emulsion gel was formed. This gel was diluted with 9.10 parts water. 0.58 parts stannous octoate and 0.92 parts chloropropyltrimethoxysilane were mixed into the emulsion 2.0 parts of 15% NH4OH water solution was added after no more than a 10 minute gestation time. This emulsion had good handling properties and formed a silicone elastomer after water evaporation. Specifically this dispersion exhibited greater resistance to extrusion and tooling than a 75% solids silicone dispersion prepared from a crosslinked silicone emulsion polymer.

Example 5

Using parts by weight based on siloxane polymer, 0.84 parts isobutyltrimethoxysilane, 1.0 part dibutyltindiacetate and 100 parts of 50,000 cs (Mw 110,000) —OH endblocked PDMS polymer were mixed together in a laboratory mixer (Whip mix). 3.04 parts water and 6.10 parts Makon 10 nonionic surfactant were mixed into the polymer until a very high solids emulsion gel was formed. The aqueous Makon 10 solution had a viscosity of 5.35 Pa-s at a shearing gradient of 1 sec$^{-1}$ as measured on a Brookefield viscometer (Brookfield Engineering Laboratories, Inc., Stoughten, MA. This gel was diluted with 7.08 parts water. This emulsion had good handling properties and formed a silicone elastomer after water evaporation. Specifically this dispersion exhibited greater resistance to extrusion and tooling than a 75% solid silicone dispersion prepared from a crosslinked silicone emulsion polymer.

Example 6

Using parts by weight based on siloxane polymer, 100 parts of 50,000 cs (110,000 Mw) —OH endblocked PDMS polymer, 0.8 part isobutyltrimethoxysilane, and 0.41 part dibutyltindilaurate were mixed together in a laboratory mixer. 6.00 parts Makon 10 nonionic surfactant and 3.0 parts water were mixed in until a very high solids gel emulsion was formed. The aqueous Makon 10 solution had a viscosity of 5.35 Pa-s at a shearing gradient of 1 sec$^{-1}$ as measured on a Brookefield viscometer (Brookfield Engineering Laboratories, Inc., Stoughten, Mass. This emulsion had good handling properties and dried to a silicone elastomer after water evaporation. Specifically this dispersion exhibited greater resistance to extrusion and tooling than a 75% solids silicone dispersion prepared from a crosslinked silicone emulsion polymer.

Example 7

Using parts by weight based on siloxane polymer, 100 parts of 50,000 cs (110,000 Mw) —OH endblocked PDMS polymer, 0.8 part isobutyltrimethoxysilane, and 0.41 part dibutyltindilaurate were mixed together in a laboratory mixer. 6.00 parts Makon 10 nonionic surfactant and 3.0 parts water were mixed in until a very high solids gel emulsion was formed. The aqueous Makon 10 solution had a viscosity of 5.35 Pa-s at a shearing gradient of 1 sec$^{-1}$ as measured on a Brookefield viscometer (Brookfield Engineering Laboratories, Inc., Stoughten, Mass. The gel was diluted with 20.87 pts of water to yield an 80% silicone solids dispersion. This emulsion had good handling properties and dried to a silicone elastomer after water evaporation. Specifically, this dispersion exhibited greater resistance to extrusion and tooling than a crosslinked 75% solids silicone dispersion prepared from a crosslinked silicone emulsion polymer.

Example 8

Using parts by weight based on siloxane polymer solids 100 parts of the following silanol endblocked PDMS polymers were used individually to prepare sealant formulations: Huls PS344.5 (8000 cs, 58,000 Mw), Huls PS345.5 (18,000 cs, 77,000 Mw), Huls PS347.5 (50,000 cs, 110,000 Mw), Huls PS348.7 (125,000–175,000 cs, 150,000 Mw). 0.8 parts of isobutyltrimethoxysilane was added to the polymer and mixed in a laboratory mixer (Whip mix). 4.0 parts of Tergitol TMN-6 nonionic surfactant and 3.0 parts of water were mixed with the polymer until a clear gel emulsion was formed. This emulsion was diluted with 17.1 parts water. Dibutyltindilaurate was added at a level of 0.4 parts to the emulsion to effect crosslinking of the emulsion particles. All the emulsions had good handling properties and dried to a silicone elastomer after water evaporation. Specifically, these dispersions exhibited greater resistance to extrusion and tooling than a 75% solids silicone dispersion prepared from a crosslinked silicone emulsion polymer.

Example 9

Using parts by weight based on siloxane polymer, 100 parts of 50,000 cst silanol endblocked PDMS polymer and 4.0 parts of a 45% aqueous solution of Tergitol TMN-6 were then mixed until a very high solids emulsion gel was formed. The aqueous Tergitol TMN-6 solution had a viscosity of 0.082 Pa-s at a shearing gradient of 1 sec$^{-1}$ as measured on a Brookefield viscometer (Brookfield Engineering Laboratories, Inc., Stoughten, Mass.). This emulsion gel was diluted to an 80% silicone solids emulsion. 0.5 parts of dibutyltindilaurate (DBTDL) and 1.0 part of dimethylmethylhydrogen copolymer oligomer were mixed into the emulsion.

This formulation formed a tack free silicone elastomer after water evaporation. It had a tensile strength of 40 psi and an elongation of 922 and a Shore A durometer of 13.

Example 10

Using parts by weight based on siloxane polymer, 100 parts of 50,000 cst silanol endblocked PDMS polymer and 4.0 parts of a 45% aqueous solution of Tergitol TMN-6 were mixed until a very high solids emulsion gel was formed. The aqueous Tergitol TMN-6 solution had a viscosity of 0.082 Pa-s at a shearing gradient of 1 sec$^{-1}$ as measured on a Brookefield viscometer (Brookfield Engineering Laboratories, Inc., Stoughten, Mass.). This emulsion gel was diluted to an 80% silicone solids emulsion. 0.5 parts of diethylhydroxylamine and 1.0 part of dimethylmethylhydrogen copolymer oligomer were mixed into the emulsion.

This formulation, was extruded after 3 days gestation, and formed a tacky silicone elastomer after standard curing conditions. It had a tensile strength of 10 psi and an elongation of 2203. The elastomer was too soft for a Shore A durometer measurement.

Example 11

Using parts by weight based on siloxane polymer, 100 parts of 50,000 cst silanol endblocked PDMS polymer and 4.0 parts of a 45% aqueous solution of Tergitol TMN-6 were mixed until a very high solids emulsion gel was formed. The aqueous Tergitol TMN-6 solution had a viscosity of 0.082 Pa-s at a shearing gradient of 1 sec$^{-1}$ as measured on a Brookefield viscometer (Brookfield Engineering Laboratories, Inc., Stoughten, Mass.). This emulsion gel was diluted to an 80% silicone solids emulsion. 0.5 parts of dibutyltindilaurate (DBTDL) and 1.0 part of vinyltris(methylethylketoxime)silane were mixed into the emulsion.

This formulation formed a tack free silicone elastomer after water evaporation. It had a tensile strength of 33 psi and an elongation of 976 and a Shore A durometer of 3. These films were cast in accord with the preamble of the example section.

Example 12

Using parts based on siloxane polymer, 100 parts of 60,000 cst trimethoxysilyl-endblocked PDMS polymer and 4.0 parts of a 45% aqueous solution of Tergitol TMN-6 were mixed until a very high solids emulsion gel was formed. The aqueous Tergitol TMN-6 solution had a viscosity of 0.082 Pa-s at a shearing gradient of 1 sec$^{-1}$ as measured on a Brookefield viscometer (Brookfield Engineering Laboratories, Inc, Stoughten, Mass.). This emulsion gel was diluted to an 80% silicone solids emulsion. 0.5 parts of TYZOR DC (a chelated titanate from DuPont, Wilmington, Del.) were mixed into the emulsion.

This formulation formed a tack free silicone elastomer after water evaporation. It had a tensile strength of 44 psi and an elongation of 583 and a Shore A durometer of 6.

Example 13

Using parts by weight based on siloxane polymer, 100 parts of 50,000 cst silanol endblocked PDMS polymer and 4.0 parts of a 45% aqueous solution of Tergitol TMN-6 were mixed until a very high solids emulsion gel was formed. The aqueous Tergitol TMN-6 solution had a viscosity of 0.082 Pa-s at a shearing gradient of 1 sec$^{-1}$ as measured on a Brookefield viscometer (Brookfield Engineering Laboratories, Inc., Stoughten, Mass.). This emulsion gel was diluted to an 80% silicone solids emulsion. 0.5 parts of dibutyltindilaurate (DBTDL) and 1.0 part of methyltriacetoxysilane were mixed into the emulsion.

This formulation formed a tack free silicone elastomer after water evaporation. It had a tensile strength of 77 psi and an elongation of 1042 and a Shore A durometer of 6.

Example 14

Using parts by weight based on siloxane polymer, 100 parts of 50,000 cst silanol endblocked PDMS polymer and 4.0 parts of a 45% aqueous solution of Tergitol TMN-6 were mixed until a very high solids emulsion gel was formed. The aqueous Tergitol TMN-6 solution had a viscosity of 0.082 Pa-s at a shearing gradient of 1 sec$^{-1}$ as measured on a Brookefield viscometer (Brookfield Engineering Laboratories, Inc., Stoughten, Mass.). This emulsion gel was diluted to an 80% silicone solids emulsion. 0.5 parts of dibutyltindilaurate (DBTDL) and 1.0 part of vinyltriisopropenoxysilane were mixed into the emulsion.

This formulation formed a tack free silicone elastomer after water evaporation. It had a tensile strength of 48 psi and an elongation of 553 and a Shore A durometer of 10.

Example 15

Using parts by weight based on siloxane polymer, 100 parts of 50,000 cst silanol endblocked PDMS polymer and 4.0 parts of a 45% aqueous solution of Tergitol TMN-6 were mixed until a very high solids emulsion gel was formed. The aqueous Tergitol TMN-6 solution had a viscosity of 0.082 Pa-s at a shearing gradient of 1 sec$^{-1}$ as measured on a Brookefield viscometer (Brookfield Engineering Laboratories, Inc., Stoughten, Mass.). This emulsion gel was diluted to an 80% silicone solids emulsion. 0.5 parts of dibutyltindilaurate (DBTDL) and 1.0 part of tris(dimethylamino)methylsilane were mixed into the emulsion.

This formulation formed a tack free silicone elastomer after water evaporation. It had a tensile strength of 37 psi and an elongation of 874 and a Shore A durometer of 5.

Example 16

Emulsion A:

Using parts weight by weight based on siloxane polymer, in a laboratory mixer (Hauschild), 0.3 parts of a platinum/vinylterminated siloxane complex (containing ca. 0.6% platinum) were mixed into 100 parts of a 55,000 cst Vi terminated PDMS containing 0.088 vinyl functionality. 4 parts of a 45% solids aqueous solution of Tergitol TMN-6 were then mixed in until a 94% silicone solids, oil in water, emulsion gel was formed. This emulsion gel was diluted to an 80% silicone solids emulsion. The aqueous Tergitol TMN-6 solution had a viscosity of 0.082 Pa-s at a shearing gradient of 1 sec$^{-1}$ as measured on a Brookefield viscometer (Brookfield Engineering Laboratories, Inc, Stoughten, Mass.).

Emulsion B:

Using parts by weight based on siloxane polymer, in a laboratory mixer (Hauschild), 1.5 parts of dimethyl-methylhydrogen siloxane (5 cst viscosity, containing 0.76% Si—H) were mixed into 100 parts of a 55,000 cst vinyl terminated PDMS containing 0.088 vinyl functionality 4 parts of a 45% solids aqueous solution of Tergitol TMN-6 were then mixed in until a 94% silicone solids, oil in water, emulsion gel was formed. This emulsion gel was diluted to an 80% silicone solids emulsion. The aqueous Tergitol TMN-6 solution had a viscosity of 0.082 Pa-s at a shearing gradient of 1 sec$^{-1}$ as measured on a Brookefield viscometer (Brookfield Engineering Laboratories, Inc., Stoughten, Mass.).

Emulsion C:

Equal parts of Emulsion A and Emulsion B were mixed in a laboratory mixer (Hauschild).

Emulsion C, after 4 days, formed a tack free silicone elastomer after water evaporation.

Example 17

Using parts based on siloxane polymer, 100 parts of 60,000 cst trimethoxysilyl-endblocked PDMS polymer and 4.0 parts of a 45% aqueous solution of Tergitol TMN-6 were mixed until a very high solids emulsion gel was formed. The aqueous Tergitol TMN-6 solution had a viscosity of 0.082 Pa-s at a shearing gradient of 1 sec$^{-1}$ as measured on a Brookefield viscometer (Brookfield Engineering Laboratories, Inc., Stoughten, Mass.). This emulsion gel was diluted to an 80% silicone solids emulsion. 0.54 parts of hexylamine and 0.72 parts of octanoic acid were mixed into the emulsion.

This formulation formed a tack free silicone elastomer after water evaporation.

Example 18

Using parts based on siloxane polymer, 100 parts of 50,000 cst silanol-endblocked PDMS polymer and 4.0 parts of a 45% aqueous solution of Tergitol TMN-6 were mixed until a very high solids emulsion gel was formed. The aqueous Tergitol TMN-6 solution had a viscosity of 0.0082 Pa-s at a shearing gradient of 1 sec$^{-1}$ as measured on a Brookefield viscometer (Brookfield Engineering Laboratories, Inc., Stoughten, Mass.). This emulsion gel was diluted to an 81% silicone solids emulsion. 0.2 parts of stannous octoate and 2.00 parts of 50% solution of vinytri-methoxysilane in pH 4 water(prehydrolyzed vinyltrimethoxysilane) were mixed into the emulsion.

This formulation formed a tack free silicone elastomer after water evaporation. The tensile was 84 psi, the elongation was 1733 and the Shore A durometer was 2.

That which is claimed is:

1. A composition comprising:
   a silicone latex free of rheology modifiers having a plurality of crosslinked polysiloxane particles, wherein said silicone latex has at least 75% silicone content by weight, and said silicone latex comprises (a) a crosslinked product of (i) 100 weight parts of a siloxane polymer or polymer mixture having a viscosity of greater than 5000 mPa.s but less than 500,000 mPa.s at 25° C., and (ii) up to 20 weight parts crosslinker, the siloxane polymer or polymer mixture having at least one polymer species of the following Formula (I):

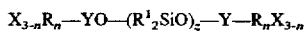

where n is 0, 1, 2 or 3 and z is an integer from 500 to 5000,

X is hydrogen, a vinyl group, a hydroxyl group, any condensable or hydrolyzable group, Y is a Si atom or a Si—(CH$_2$)$_m$—SiR$^1_2$ group, where m is 1 to 8, R is individually selected from the group consisting of aliphatic alkyl, aminoalkyl, polyaminoalkyl, epoxyalkyl, alkenyl, or aromatic groups, and R$^1$ is individually selected from the group consisting of X, aliphatic alkyl, alkenyl, and aromatic groups, (b) 0.5 to 10 weight parts surfactant,
   (c) 0.5 to 25 weight parts water, and
   (d) up to 5 weight parts catalyst.

2. The composition of claim 1, wherein the siloxane polymer or polymer mixture includes 1 to 50 weight parts of liquid, branched methylpolysiloxane polymers comprising (CH$_3$)$_3$Si$_{0.5}$, (CH$_3$)$_2$SiO, and CH$_3$SiO$_{1.5}$ units and containing from 0.1 to 8% hydroxy groups.

3. The composition of claim 1, wherein the siloxane polymer or polymer mixture includes 1 to 50 weight parts of branched methylsiloxane polymeric resins comprising, (CH$_3$)$_3$S$_{0.5}$, (CH$_3$)$_2$SiO, CH$_3$SiO$_{1.5}$, and SiO$_2$ units and containing from 0.1 to 8% hydroxyl groups.

4. The composition of claim 1, wherein the crosslinked polysiloxane particles include 1 to 10 weight parts of a compatible organic solvent.

5. The composition of claim 1, wherein the composition includes up to 10 weight parts filler.

6. The composition of claim 1, wherein the composition includes up to 20 weight parts adhesion promoter.

7. The composition of claim 1, wherein the composition includes up to 20 weight parts stabilizer.

8. The composition of claim 1, wherein the composition includes up to 20 weight parts of a silsesquioxane resin suspension.

9. The composition of claim 1, wherein the composition includes up to 10 weight parts of a catalyst deactivator.

10. The composition of claim 1, wherein the surfactant is present in an amount comprising 2 to 5 weight parts.

11. The composition of claim 1, wherein the surfactant is present in an amount comprising 0.5 to less than 3 weight parts.

12. The composition of claim 1, wherein the water is present in an amount comprising 6 to 15 weight parts.

13. The composition of claim 1, wherein the water is present in an amount comprising 0.5 to less than 2 weight parts.

14. The composition of claim 1, wherein the silicone latex comprises between 80 and 92% by weight silicone polymer content.

15. The composition of claim 1, wherein the silicone latex comprises between 84 and 90% by weight silicone polymer content.

16. The composition of claim 1, wherein the siloxane polymer has at least two hydroxyl, condensable or hydrolyzable groups, the crosslinker has, on average, at least two silicon hydrogen bonds, and the catalyst is selected from the group consisting of noble metal complexes, organic acid metal salts, titanic acid esters, amino compounds and their salts, and mixtures thereof.

17. The composition of claim 1, wherein the siloxane polymer has at least two silicon-hydrogen bonds, the composition contains a crosslinker which has, on average, at least two hydroxyl, condensable or hydrolyzable groups per molecule, and a condensation catalyst selected from the group consisting of noble metal complexes, organic acid metal salts, titanic acid esters, amino compounds and their salts, and mixtures thereof.

18. The composition of claim 1, wherein the siloxane polymer has at least two alkenyl groups per molecule bonded to silicon atom, and the crosslinker has, an average of at least two silicon-bonded hydrogen atoms, the catalyst is a noble metal catalyst, and the crosslinker is a silicon hydride crosslinker present in a amount sufficient to provide at least one hydrogen atom for each vinyl group in the siloxane polymer.

19. The composition of claim 1, wherein the siloxane polymer has at least two hydrogen-silicon bonds, the crosslinker has, on average, at least two alkenyl groups per molecule directly attached to at least one silicon atom, and the catalyst is a noble metal catalyst.

20. The composition of claim 1, wherein the siloxane polymer has at least two carboxyalkylsiloxy groups, the crosslinker is an epoxide compound selected from the group consisting of diglycidyl ethers of di- and bis-phenols, and the catalyst is selected from the group consisting of (organo) metallic compounds, amino compounds, salts of amino compounds, or mixtures thereof.

21. The composition of claim 1, wherein the siloxane polymer has at least two hydroxysiloxy groups, and the composition further has at least one crosslinker having on average at least two silacycloalkane groups per molecule and a nucleophilic catalyst.

22. The composition of claim 1, wherein the siloxane polymer has at least two silacycloalkane groups and the composition further includes a crosslinker having on average at least two hydroxyl groups per molecule and a nucleophilic catalyst.

23. The composition of claim 1, wherein the siloxane polymer has at least two silacycloalkane groups and, the composition further has a nucleophilic catalyst, and optionally, a crosslinker having on average at least two hydrolyzable groups per molecule.

24. The composition of claim 1, wherein the siloxane polymer has at least two hydroxysiloxy groups, and the composition further has at least one crosslinker having on average at least two aza-silacycloalkane groups per molecule and a condensation catalyst.

25. The composition of claim 1, wherein the siloxane polymer has at least two aza-silacycloalkane groups and the composition further includes a crosslinker having on average at least two hydroxyl groups per molecule and a condensation catalyst.

26. The composition of claim 1, wherein the siloxane polymer has at least two aza-silacycloalkane groups and, the composition further has a condensation catalyst, and optionally, a crosslinker having on average at least two hydrolyzable groups per molecule.

27. The composition of claim 1, wherein the siloxane polymer has at least two primary or secondary aminosiloxy groups, and the composition further contains an optional acrylating agent, and the crosslinker contains on average at least two carboxylic anhydride groups, and is selected from the group consisting of alkoxysilane, alkoxysiloxane, alkoxysiloxy functional resin, alkoxysilyl functional resin, and a siloxane containing carboxylic anhydride groups.

28. The composition of claim 1, wherein the siloxane polymer has at least two hydroxysiloxy or alkoxysiloxy groups, a condensation catalyst, and a crosslinker containing on average, at least two reactive silanol groups, and where the crosslinker is selected from the group consisting of a. silica,
b. silicate,
c. siliconate,
d. silanolate,
e. silanol functional silicone resins,
f. silanol functional organic resins, and
g. partial condensation products thereof.

29. The composition of claim 1, wherein the siloxane polymer is a trimethylsiloxy or hydroxyl endblocked polydiorganosiloxane, where the siloxane polymer contains sufficient alkenyl substituted siloxane units to facilitate the crosslinking of a trimethylsilyl endblocked siloxane using a peroxide or other free radical initiator.

30. The composition of claim 1, prepared by mixing siloxane polymer with surfactant and water, or with an aqueous solution of the surfactant, at sufficient shear and for a sufficient period of time to form a gel phase having at least 85% by weight silicone polymer content, then adding, if required, crosslinker, and, if required, catalyst, and diluting the gel phase with further water to the minimum silicone polymer content of at least 75%.

31. The composition of claim 1, prepared by mixing siloxane polymer and if required, crosslinker, with surfactant and water, or with an aqueous solution of the surfactant, at sufficient shear and for a sufficient period of time to form a gel phase, having at least 85% by weight silicone polymer content, then adding catalyst if required, then diluting the gel phase with further water to the desired silicone polymer content of at least 75%.

32. The composition of claim 1, prepared by mixing siloxane polymer and optionally crosslinker and optionally catalyst, with surfactant and water, or with an aqueous solution of the surf actant, at sufficient shear and for a sufficient period of time to form a gel phase, having at least 85% by weight silicone polymer content, then diluting the gel phase with further water to the desired silicone polymer content of at least 75%.

33. The composition of claim 1, prepared by mixing siloxane polymer and if required, catalyst, with surfactant and water at sufficient shear and for a sufficient period of time to form a gel phase, having at least 85% by weight silicone polymer content, then adding, if required, crosslinker to the emulsion, then diluting the gel phase with further water to the desired silicone polymer content of at least 75%.

34. The composition of claim 1, prepared by mixing siloxane polymer and crosslinker if required and catalyst if required, and any optional formulation ingredients, with surfactant and water at sufficient shear and for a sufficient period of time to form a gel phase, having at least 85% by weight silicone polymer content, then diluting the gel phase with further water to the desired silicone polymer content of at least 75%.

35. The composition of claim 5, wherein said filler is selected from the group consisting of colloidal silica, fumed silica, diatomaceous earth, ground quartz, calcium carbonate, carbon black, titanium dioxide, magnesium hydroxide, clay, aluminum oxide, hydrated alumina, expanded vermiculite, zinc oxide, mica, talc, iron oxide, barium sulfate, slaked lime, and mixtures thereof.

36. The composition of claim 5, wherein the filler is selected from the group consisting of acidic stabilized colloidal silicas, ammonium stabilized colloidal silicas, and silicas stabilized with volatile organic amines.

37. The composition of claim 5, wherein the filler is selected from the group consisting of natural fibers, regenerated fibers, and synthetic fibers.

38. The composition of claim 5, wherein the filler is selected from the group consisting of aluminum hydroxide (trihydrate), non-flammable fibers, ceramic or glass fibers or microspheres, and vermiculite.

39. The composition of claim 5, wherein the filler is selected from the group consisting of carbon black, metal coated ceramic spheres or fibers, metal coated glass spheres or fibers, uncoated or metal coated graphite fibers or spheres.

40. The composition of claim 7, wherein the stabilizer is an organic amine composed of carbon, hydrogen and nitrogen atoms or carbon, hydrogen, nitrogen, and oxygen atoms, said organic amine being soluble in the amount of water present in the emulsion.

41. The composition of claim 7, wherein the stabilizer is added in an amount less than 5 weight parts for each 100 weight parts of siloxane polymer.

42. The composition of claim 7, in which the stabilizer is selected from the group consisting of diethylamine, 2-amino-2-methyl-1-propanol, and tetramethylbutylguanidine.

43. The composition of claim 7, which also contains colloidal silica as reinforcing filler.

44. The composition of claim 1, wherein the water has been evaporated from the silicone latex.

45. A method of making a silicone latex having a plurality of crosslinked polysiloxane particles, comprising the steps of:

forming a mixture having
(a) 100 weight parts siloxane polymer or polymer mixture having a viscosity of greater than 5000 mPa.s but less than 500,000 mPa.s at 25° C., the siloxane polymer or polymer mixture having at least one polymer species of the following Formula (I):

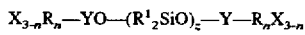

where n is 0, 1, 2 or 3 and z is an integer from 500 to 5000,

X is hydrogen, a vinyl group, a hydroxyl group, any condensable or hydrolyzable group, Y is a Si atom or a Si—$(CH_2)_m$—$SiR^1_2$ group, where m is 1 to 8, R is individually selected from the group consisting of aliphatic alkyl, aminoalkyl, polyaminoalkyl, epoxyalkyl, alkenyl, or aromatic groups, and $R^1$ is individually selected from the group consisting of X, aliphatic, alkenyl, and aromatic groups, (b) 0.5 to 10 weight parts of a surfactant,
(c) 0.5 to 15 weight parts water, emulsifying the mixture into a gel phase having a silicone polymer content of at least 85% by weight;

diluting the emulsion with further water to obtain a silicon content of at least 75% by weight, adding up to 5 weight parts catalyst either before or after the emulsification or before or after the dilution; and adding up to 20 weight parts crosslinker either before or after the emulsification, or before or after the dilution.

46. The method of claim 45, wherein the siloxane polymer or polymer mixture includes 1 to 50 weight parts of liquid, branched methylpolysiloxane polymers comprising $(CH_3)_3 Si_{0.5}$, $(CH_3)_2SiO$, and $CH_3SiO_{1.5}$ units and containing from 0.1 to 8% hydroxy groups.

47. The method of claim 45, wherein the siloxane polymer or polymer mixture includes 1 to 50 weight parts of branched methylsiloxane polymeric resins comprising $(CH_3)_3Si_{0.5}$, $(CH_3)_2SiO$, $CH_3SiO_{1.5}$, and $SiO_2$ units and containing from 0.1 to 8% hydroxyl groups.

48. The method of claim 45, wherein the siloxane polymer or polymer mixture includes 1 to 10 weight parts of a compatible organic solvent.

49. The method of claim 45, comprising the additional step of adding up to 10 weight parts filler.

50. The method of claim 45, comprising the additional step of adding up to 20 weight parts adhesion promoter.

51. The method of claim 45, comprising the additional step of adding up to 20 weight parts stabilizer.

52. The method of claim 45, comprising the additional step of adding up to 20 weight parts of an silsesquioxane resin suspension.

53. The method of claim 45, comprising the additional step of adding up to 10 weight parts of a catalyst deactivator.

54. The method of claim 45, wherein the surfactant is present in an amount comprising 2 to 5 weight parts.

55. The method of claim 45, wherein the surfactant is present in an amount comprising 0.5 to less than 3 weight parts.

56. The method of claim 45, wherein the water in (c) is present in an amount comprising 6 to 15 weight parts.

57. The method of claim 45, wherein the water is in (c) present in an amount comprising 0.5 to less than 2 weight parts.

58. The method of claim 45, wherein the silicone latex comprises between 80 and 92% by weight silicone polymer content.

59. The method of claim 45, wherein the silicone latex comprises between 84 and 90% by weight silicone polymer content.

60. The method of claim 45, characterized by the fact that the viscosity of the surfactant water phase, used in emulsifying the siloxane phase, is less than half of the viscosity of the siloxane phase.

61. The method of claim 45, characterized by the fact that the viscosity of the surfactant water phase, used in emulsifying the siloxane phase, is less than 1/10 of the viscosity of the siloxane phase.

* * * * *